(12) United States Patent
Michalski et al.

(10) Patent No.: US 10,540,057 B2
(45) Date of Patent: *Jan. 21, 2020

(54) METHOD AND APPARATUS FOR USING SELECTED CONTENT TRACKS FROM TWO OR MORE PROGRAM CHANNELS TO AUTOMATICALLY GENERATE A BLENDED MIX CHANNEL FOR PLAYBACK TO A USER UPON SELECTION OF A CORRESPONDING PRESET BUTTON ON A USER INTERFACE

(71) Applicant: Sirius XM Radio Inc., New York, NY (US)

(72) Inventors: Richard A. Michalski, Coral Springs, FL (US); Stuart A. Cox, Boca Raton, FL (US); Paul D. Marko, Pembroke Pines, FL (US); Mark Rindsberg, Boca Raton, FL (US); Greg Nease, Princeton, NJ (US); Glenn Peffers, Lake Worth, FL (US)

(73) Assignee: Sirius XM Radio Inc., New York, NY (US)

( * ) Notice: Subject to any disclaimer, the term of this patent is extended or adjusted under 35 U.S.C. 154(b) by 139 days.

This patent is subject to a terminal disclaimer.

(21) Appl. No.: 14/685,012

(22) Filed: Apr. 13, 2015

(65) Prior Publication Data

US 2015/0220223 A1 Aug. 6, 2015

Related U.S. Application Data

(63) Continuation of application No. 13/531,440, filed on Jun. 22, 2012, now Pat. No. 9,008,812, which is a (Continued)

(51) Int. Cl.
G06F 3/0482 (2013.01)
H04H 20/74 (2008.01)
(Continued)

(52) U.S. Cl.
CPC ........ *G06F 3/0482* (2013.01); *G06F 3/04842* (2013.01); *G06F 3/04847* (2013.01);
(Continued)

(58) Field of Classification Search
CPC ........ G06F 3/165; H04H 20/28; H04H 60/04; H04H 60/13; H04N 21/4263; G11B 27/34;
(Continued)

(56) References Cited

U.S. PATENT DOCUMENTS 5,406,558 A * 4/1995 Rovira ............... H04B 7/18523
348/734
5,973,723 A 10/1999 DeLuca
(Continued)

FOREIGN PATENT DOCUMENTS

WO WO2009154760 A1 12/2009
WO WO2013192389 A1 12/2013

*Primary Examiner* — Andrew C Flanders
(74) *Attorney, Agent, or Firm* — Kramer Levin Naftalis & Frankel LLP

(57) ABSTRACT

A method and apparatus are provided for generating a personalized radio channel playlist by simultaneously buffering multiple received channels from one or more source streams, and then selecting songs or tracks to playback from the buffered channels. Users can specify favorite channels for building their personal playlists, or multiple default playlist channels can be provided by genre or channels related in some other way. Navigation tools permit users to skip ahead and backward in the playback stream. A personalized radio channel playlist can be implemented as (1) content selected from buffered channels based on user preferences for artists, songs and the like, or (2) as a Mix Channel in which content from selected buffered channels is automatically mixed for playback in response to selection of a preset button assigned to the Mix Channel.

30 Claims, 22 Drawing Sheets

Related U.S. Application Data continuation-in-part of application No. 12/213,414, filed on Jun. 19, 2008, now Pat. No. 8,223,975, and a continuation-in-part of application No. PCT/US2012/025091, filed on Feb. 14, 2012.

(51) Int. Cl.
*H04H 20/40* (2008.01)
*H04H 20/26* (2008.01)
*G06F 3/0484* (2013.01)
*H04B 7/185* (2006.01)
*H04H 60/91* (2008.01)

(52) U.S. Cl.
CPC .......... *H04B 7/1851* (2013.01); *H04H 20/74* (2013.01); *H04H 20/26* (2013.01); *H04H 20/40* (2013.01); *H04H 60/91* (2013.01)

(58) Field of Classification Search
CPC .... G11B 27/028; G11B 27/034; G11B 27/038
See application file for complete search history.

(56) References Cited

U.S. PATENT DOCUMENTS

| | | | |
|---|---|---|---|
| 6,011,851 A | 1/2000 | Connor et al. | |
| 6,490,728 B1* | 12/2002 | Kitazato | H04H 20/74 348/461 |
| 6,564,003 B2 | 5/2003 | Marko et al. | |
| 6,588,015 B1 | 7/2003 | Eyer et al. | |
| 6,694,316 B1 | 2/2004 | Langseth et al. | |
| 6,785,656 B2 | 8/2004 | Patsiokas | |
| 6,876,835 B1 | 4/2005 | Marko et al. | |
| 6,961,511 B2 | 11/2005 | Ohno | |
| 7,047,548 B2 | 5/2006 | Bates et al. | |
| 7,054,546 B2 | 5/2006 | Murakami et al. | |
| 7,058,376 B2 | 6/2006 | Logan et al. | |
| 7,058,694 B1* | 6/2006 | De Bonet | H04L 29/06027 455/3.03 |
| 7,116,894 B1 | 10/2006 | Chatterton | |
| 7,266,207 B2 | 9/2007 | Wilcock et al. | |
| 7,343,179 B1 | 3/2008 | Theis et al. | |
| 7,574,513 B2 | 8/2009 | Dunning et al. | |
| 7,720,432 B1 | 5/2010 | Colby et al. | |
| 7,725,919 B1 | 5/2010 | Thiagarajan et al. | |
| 7,732,697 B1 | 6/2010 | Wieder | |
| 7,831,663 B2 | 11/2010 | Ludwig et al. | |
| 7,848,618 B2 | 12/2010 | Potrebic et al. | |
| 7,941,525 B1 | 5/2011 | Yavilevich | |
| 8,223,975 B2 | 7/2012 | Marko | |
| 8,380,333 B2 | 2/2013 | Ojala | |
| 8,660,280 B2 | 2/2014 | Xiang et al. | |
| 8,848,112 B2 | 9/2014 | Seo | |
| 8,917,974 B2 | 12/2014 | Oh | |
| 8,971,541 B2 | 3/2015 | Marko | |
| 9,008,812 B2* | 4/2015 | Michalski | H04H 20/74 700/94 |
| 9,075,807 B2 | 7/2015 | St. John-Larkin | |
| 9,154,248 B2 | 10/2015 | Cox | |
| 9,219,634 B1 | 12/2015 | Morse | |
| 2001/0028782 A1 | 10/2001 | Ohno | |
| 2002/0032019 A1 | 3/2002 | Marks et al. | |
| 2003/0009765 A1 | 1/2003 | Linden et al. | |
| 2003/0014767 A1 | 1/2003 | Stumphauzer, II | |
| 2003/0115604 A1 | 6/2003 | Yamamura et al. | |
| 2003/0128774 A1 | 7/2003 | Suzuki et al. | |
| 2003/0219222 A1 | 11/2003 | Fraleu et al. | |
| 2003/0236843 A1 | 12/2003 | Weber et al. | |
| 2004/0058641 A1 | 3/2004 | Acker | |
| 2004/0153178 A1 | 8/2004 | Koch et al. | |
| 2004/0255336 A1 | 12/2004 | Logan | |
| 2004/0264442 A1 | 12/2004 | Kubler et al. | |
| 2004/0266336 A1* | 12/2004 | Patsiokas | H04H 40/90 455/3.04 |
| 2005/0091275 A1* | 4/2005 | Burges | G06F 17/30017 |
| 2005/0132418 A1 | 6/2005 | Barton et al. | |
| 2005/0159122 A1 | 7/2005 | Mayer | |
| 2005/0249080 A1 | 11/2005 | Foote et al. | |
| 2005/0289151 A1 | 12/2005 | Burke | |
| 2006/0029372 A1 | 2/2006 | Barrett et al. | |
| 2006/0040609 A1 | 2/2006 | Petschke et al. | |
| 2006/0083482 A1 | 4/2006 | Arora | |
| 2006/0088000 A1 | 4/2006 | Hannu | |
| 2006/0104314 A1 | 5/2006 | Miyaji et al. | |
| 2006/0123053 A1 | 6/2006 | Scannell, Jr. | |
| 2006/0153408 A1 | 7/2006 | Faller et al. | |
| 2006/0173974 A1 | 8/2006 | Tang | |
| 2006/0233378 A1 | 10/2006 | Kim et al. | |
| 2006/0251263 A1 | 11/2006 | Vronay | |
| 2006/0252457 A1 | 11/2006 | Schrager | |
| 2007/0014312 A1 | 1/2007 | Sugimoto | |
| 2007/0014536 A1 | 1/2007 | Hellman | |
| 2007/0022197 A1 | 1/2007 | Logvinov et al. | |
| 2007/0022454 A1 | 1/2007 | Yoon | |
| 2007/0061759 A1 | 3/2007 | Klein, Jr. | |
| 2007/0083901 A1 | 4/2007 | Bond | |
| 2007/0087686 A1 | 4/2007 | Holm et al. | |
| 2007/0093263 A1 | 4/2007 | Song | |
| 2007/0097272 A1 | 5/2007 | Moradi | |
| 2007/0123185 A1 | 5/2007 | Welk et al. | |
| 2007/0124794 A1 | 5/2007 | Marko et al. | |
| 2007/0192795 A1 | 8/2007 | Kellner et al. | |
| 2007/0212023 A1 | 9/2007 | Whillock | |
| 2007/0250319 A1 | 10/2007 | Tateishi et al. | |
| 2007/0256100 A1 | 11/2007 | Jeong | |
| 2007/0277214 A1 | 11/2007 | Kim et al. | |
| 2008/0010648 A1 | 1/2008 | Ando et al. | |
| 2008/0015718 A1 | 1/2008 | Yoneda et al. | |
| 2008/0019371 A1 | 1/2008 | Anschutz et al. | |
| 2008/0043685 A1 | 2/2008 | Sandblom | |
| 2008/0069519 A1 | 3/2008 | Lang et al. | |
| 2008/0092168 A1 | 4/2008 | Logan et al. | |
| 2008/0101765 A1 | 5/2008 | Lee | |
| 2008/0163290 A1 | 7/2008 | Marko | |
| 2008/0168501 A1 | 7/2008 | Migos et al. | |
| 2008/0199149 A1 | 8/2008 | Oh | |
| 2008/0226086 A1 | 9/2008 | Kageyama et al. | |
| 2008/0254751 A1 | 10/2008 | Lazaridis | |
| 2008/0282036 A1 | 11/2008 | Ganesan | |
| 2009/0019513 A1 | 1/2009 | Seong | |
| 2009/0046864 A1 | 2/2009 | Mahabub et al. | |
| 2009/0079872 A1 | 3/2009 | Seong | |
| 2009/0165062 A1 | 6/2009 | Harris | |
| 2009/0170457 A1 | 7/2009 | Videtich | |
| 2010/0067431 A1 | 3/2010 | McNeely | |
| 2010/0268361 A1 | 10/2010 | Mantel et al. | |
| 2011/0004826 A1 | 1/2011 | Cho | |
| 2011/0075985 A1 | 3/2011 | Potrebic | |
| 2011/0129201 A1 | 6/2011 | McLean | |
| 2012/0144430 A1 | 8/2012 | Steele | |
| 2013/0158693 A1 | 6/2013 | Beckmann et al. | |

* cited by examiner

FIG. 3

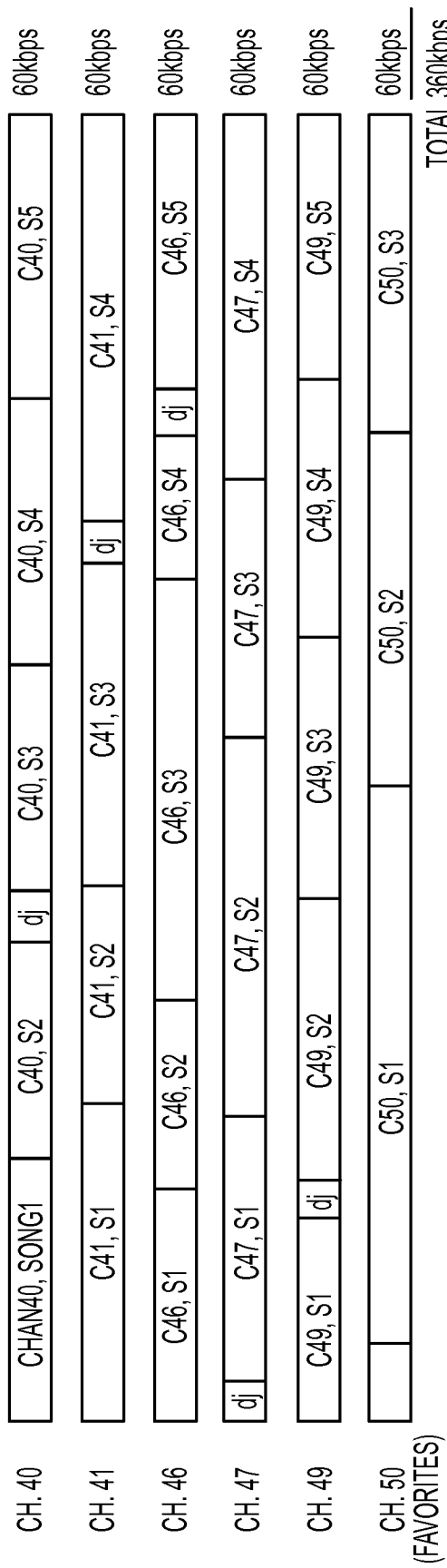
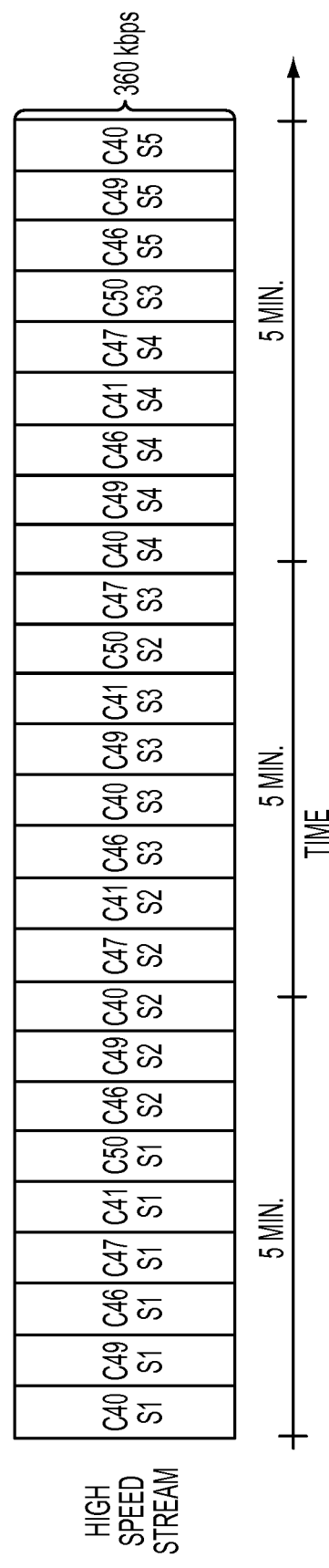
FIG. 4A
FIG. 4B

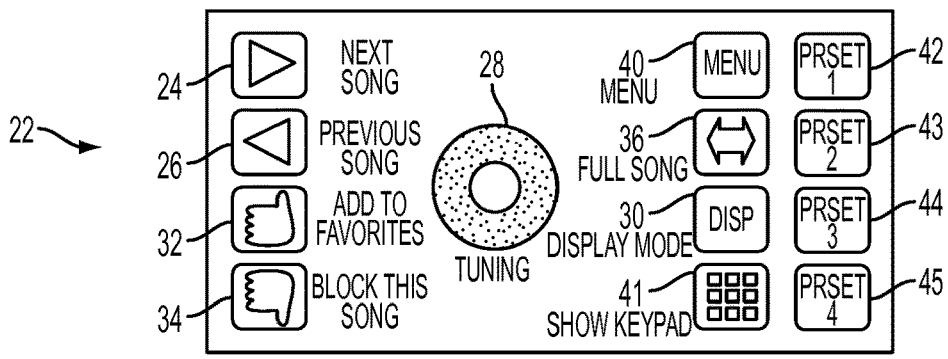
FIG. 6
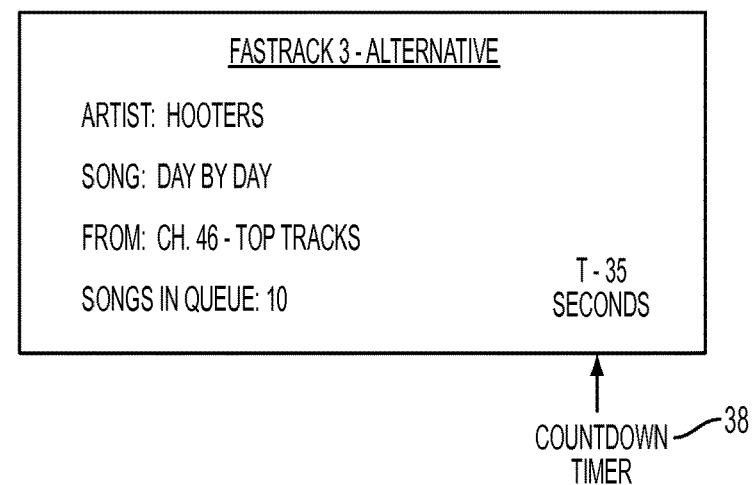
FIG. 7
FIG. 8

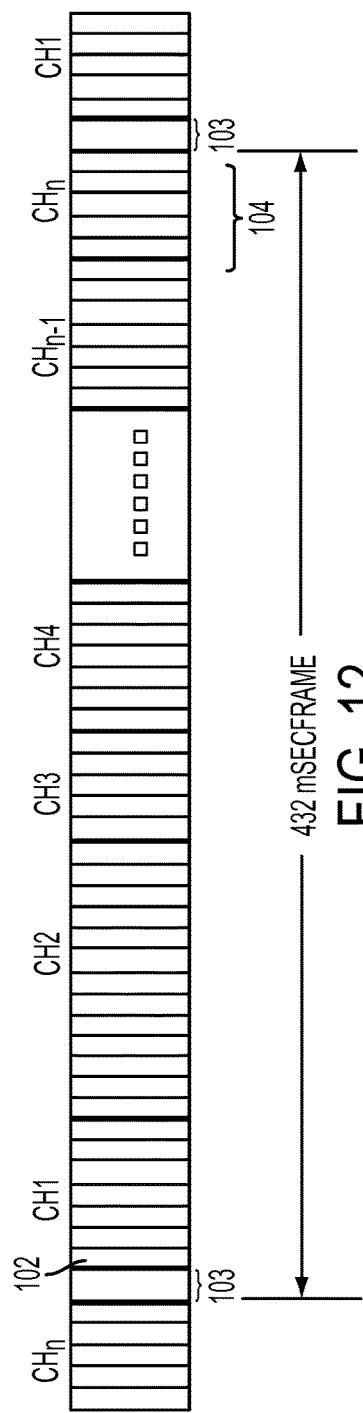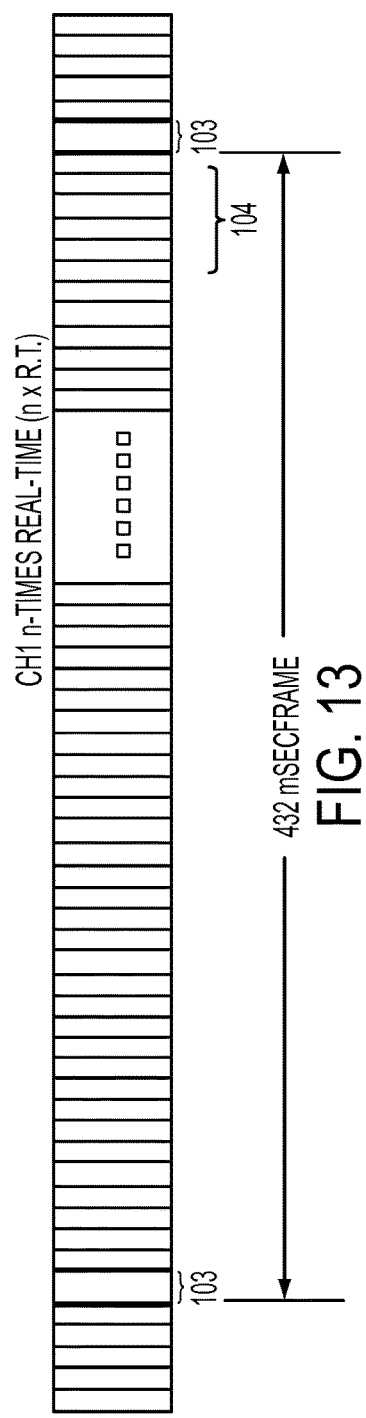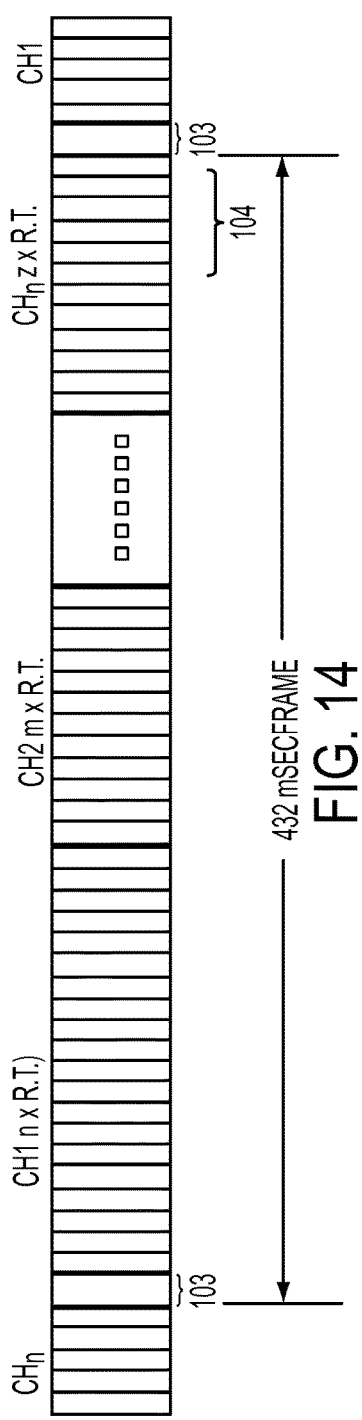

METHOD AND APPARATUS FOR USING SELECTED CONTENT TRACKS FROM TWO OR MORE PROGRAM CHANNELS TO AUTOMATICALLY GENERATE A BLENDED MIX CHANNEL FOR PLAYBACK TO A USER UPON SELECTION OF A CORRESPONDING PRESET BUTTON ON A USER INTERFACE

This application is a continuation application of U.S. patent application Ser. No. 13/531,440, filed Jun. 22, 2012, which is a continuation-in-part application of U.S. patent application Ser. No. 12/213,414, filed Jun. 19, 2008, and a continuation-in-part application of International PCT application no. PCT/US2012/25091, filed Feb. 14, 2012, the entire contents of which are incorporated herein by reference.

CROSS-REFERENCE TO RELATED APPLICATIONS

Related subject matter is disclosed and claimed in U.S. patent application Ser. No. 09/695,226, filed Oct. 25, 2000 (now issued as U.S. Pat. No. 7,180,917), in U.S. patent application Ser. No. 10/831,343, filed Apr. 26, 2004 (now issued as U.S. Pat. No. 7,454,166), in U.S. patent application Ser. No. 11/892,475, filed Aug. 23, 2007 (now issued as U.S. Pat. No. 7,822,381), in U.S. patent application Ser. No. 12/000,198, filed Dec. 10, 2007 (now issued as U.S. Pat. No. 8,544,038), and in U.S. patent application Ser. No. 12/735,211, filed Dec. 27, 2007, the entire contents of which are incorporated herein by reference.

FIELD OF THE INVENTION

The present invention relates to a system and method for providing a broadcast radio service listener (e.g. Satellite Radio, AM, FM, HD Radio, etc.) with the ability to generate a customized blend of content from at least two channels on a radio receiver as the content is received. The invention relates generally to a radio receiver operation (e.g., hereinafter referred to as "Mixed Channel" operation) whereby the receiver buffers content from a number of channels designated as Mixed Channel constituents and outputs the Mixed Channel in response to activation of a single user interface control button. Activating the single user interface control button during real-time reception of the content allows the user to hear selected content from each of the constituent channels in a way that provides for greater diversity of content than selecting and tuning to only a single channel, while also employing a simple user interface. Further, the present invention relates to a system and method for buffering content from two or more channels in at least one transmitted source stream as they are received, and for optionally alternating playback of the buffered content among the two or more channels with selected stored content that has identifiable track boundaries.

BACKGROUND OF THE INVENTION

On-line personalized radio service has demonstrated its appeal to music fans as evidenced by the continued growth of personalized radio service providers such as Pandora, LastFM and Slacker. These providers assemble personalized playlists for users by accessing a large music library where each song has a metadata field containing ratings on multiple stylistic parameters. A user inputs a preferred music style, and the provider's system extracts songs from the library for the playlist based on correlation to the song metadata field. Advantageously, users are provided with the capability to accelerate their discovery of new content which is largely aligned with their personal preferences, by skipping over content in the playlist which the user finds uninteresting. In mobile environments, these existing on-line music services require development of new user interface (UI) designs and are complicated for users to understand. For example, vehicles are provided with some type of USB or other auxiliary port or interface for connecting an iPod or other portable computing device or memory device (e.g., a connector, port, adapter, multimedia interface or dongle) and/or an upgraded head unit, and customized screens for the device and/or head unit display to allow users to enter their preferences and otherwise search for content and navigate received content. Use of such screens on portable device and/or head unit displays is distracting for mobile users (e.g., while driving). A need therefore exists for a simplified user interface that allows a mobile user to be exposed to different content with minimal distraction.

Receiving broadcast content via a radio receiver device can be a simpler means for obtaining content for playback than an online music service. For example, satellite digital audio radio service (SDARS) offers many more than 100 channels of audio content, and advances in audio compression and transmission technology is increasing this number all the time. Existing user interfaces for receiving SDARS or other transmitted radio programming, however, typically only support 5 or 6 readily available preset buttons. In some cases, a user interface is provided with two or three "banks" of presets, along with a method for switching among the banks of presets. Navigating to other channels not stored as presets requires entering numbers in a keypad, by rotating a dial, or pressing a tune-up/tune-down button, which can be inconvenient and distracting.

In addition, with existing radio receiver hardware, a user is limited to listening to one channel at a time and therefore misses the opportunity to be exposed to content simultaneously broadcast on other program channels. Further, individual channels may be generated from a somewhat limited song playlist according to the channel specifications of the programming center or content provider (e.g., a classic rock channel that is generated from a playlist of a preselected number of songs). A user typically "channel surfs" or listens to what is being played on other program channels by frequently changing the channel on the radio receiver. This user behavior often results in an unsatisfactory listening experience since the user is having to frequently operate a user control button or dial. Commonly owned U.S. Published Patent Application No. 200903220075 addresses this shortcoming by proposing a satellite digital audio radio service (SDARS)-based personal radio service that provides the user with an option to be exposed to content simultaneously broadcast on multiple channels selected for building a personalized radio channel playlist. This personal radio service, however, requires changes to the user interface (e.g., vehicle SDARS radio receiver) such as additional buttons and more active user participation to select and filter buffered content.

As stated above, satellite radio offers more than 100 channels of audio content. After initially exploring the content offering, subscribers typically narrow their listening choices to 10 or fewer favorite channels, which may be any combination of music and talk channels. For example, a subscriber may prefer listening to popular music and may preset 5 or 6 popular music channels on the radio, along with a comedy channel and news channel. With present radio receiver hardware, the subscriber is limited to listening to one channel at a time and therefore misses the opportunity to be exposed to content simultaneously broadcast on the other favorite channels. A need therefore exists for a SDARS or similar transmitted programming service that provides the subscriber with an option to be exposed to content simultaneously broadcast on multiple channels selected for building a personalized radio channel playlist.

A need therefore also exists for a simple user interface for a SDARS or similar transmitted programming-based radio service (or other transmitted content service with Program Associated Data or other data or means to distinguish transitions between content segments or songs) that allows a user to playback a blended mix of content from two or more program channels based on the selection of a single preset button on a radio receiver user interface.

In addition, conventional personalized radio services such as Pandora lack the advantages of exposing users to diverse and professionally curated content delivered by a program service such as a SDARS. For example, SDARS provides a multitude of program channels covering a different types of content (e.g., different genres of music such as rock, country, jazz, classical, among others, a variety of different program channels within each music genre, as well as news, sports, comedy and other types of programming) that is continually researched, discovered, updated and curated (e.g., with disk jockey or "DJ" commentary) by programmers who are knowledgeable with that particular type of content. A need therefore exists for a radio service that is broadcast, streamed or otherwise transmitted to provide updated content and a spontaneous listening experience with greater opportunity for exposure to new music and other types of content. Further, a need exists for a live satellite or streamed radio offering with low cost hardware that does not require a large local song database to be built over time at a receiver to enable exposure to content simultaneously transmitted on multiple channels.

Conventional personalized radio services such as Pandora and Slacker enable users to set up different playlists for different genre preferences such as alternative, classical and comedy, but do not provide the capability to mix diverse personal content preferences into a single playlist. For example, conventional personalized radio services do not carry non-music tracks or segments (e.g., comedy tracks) which some users might like in a mixed or blended channel playlist. A need exists for a transmitted programming service that allows the subscriber to select from among the diverse content channels simultaneously transmitted in a programming stream to build a personalized radio channel playlist from both music channels and talk channels (e.g., comedy channels), the content of which is not typically provided in the online libraries of conventional personalized radio service providers. A need also exists to expose users to diverse preferred content in a single continuous playlist without requiring manual interaction or forethought to change playlists or channels.

SUMMARY OF THE INVENTION

Exemplary embodiments of the present invention address at least the above problems and/or disadvantages and provide at least the advantages described below.

In accordance with illustrative embodiments of the present invention, a method and apparatus (e.g., a receiver or other user device) and computer readable code on a computer-readable medium are provided for generating a Mix Channel from one or more received streams. The Mix Channel is generated by receiving at a receiver a plurality of program channels from at least one transmitted content stream, each of the plurality of program channels comprising multiple segments of transmitted content; designating at the receiver two or more of the plurality of channels as constituent channels to generate the mix channel; storing the constituent channels in a buffer as the plurality of program channels are received; and playing back a selected segment from each of the buffered constituent channels sequentially in a designated channel order in response to activation of a single user interface control button wherein the activation of the single user interface control button commences the playing back of segments from each of the buffered constituent channels sequentially by automatically switching between the buffered constituent channels in the designated channel order. The constituent channels can comprise, for example, a selected subset of the received plurality of channels, and can be specified by a user, or a content provider that transmits the at least one transmitted content stream.

In accordance with illustrative embodiments of the present invention, the single user interface control button can be, for example, a physical button on a user interface, and a soft button on a programmable touch-sensitive display screen.

In accordance with illustrative embodiments of the present invention, the receiver has a user interface comprising a plurality of buttons corresponding to respective ones of the constituent channels for directly tuning individually to the corresponding one of the constituent channels when activated, and the activation of the single user interface control button commences the playing back of segments from each of the buffered constituent channels that correspond to the plurality of buttons. In addition, the user interface can also comprise, for example, a programmable touch-sensitive display screen having a display area showing a first bank of soft buttons programmable to tune directly to respective ones of the constituent channels when activated, where the display area can be programmed to show a second bank of soft buttons programmable to tune to respective ones of a group of channels comprising at least one channel that is different from the constituent channels. The receiver can be configured to buffer the group of channels as they are received, and activation of the single user interface control button commences playback of segments from each of the group of channels when the second bank of soft buttons is displayed. Alternatively, multiple constituent channels can be assigned to a single preset button on the user interface.

In accordance with exemplary embodiments of the present invention, a method and apparatus (e.g., a receiver) and computer readable code on a computer-readable medium are configured to identify the stop and start of pieces of content (e.g., songs, tracks or other identifiable content segments) and to automatically determine an order for switching among the set of channels and for selecting tracks for playback from within the buffered content for the set of channels.

In accordance with exemplary embodiments of the present invention, a method and apparatus (e.g., a receiver) and computer readable code on a computer-readable medium are configured to enhance channel button functionality that is typically available on radio receivers. Existing channel buttons allow for assigning the currently tuned channel to a channel button through one of two typical methods: either pushing a "set" button followed by selecting a channel button, or more commonly simply pressing and holding a channel button for a time period of, for example, 3 seconds. Generally a tone or beep indicates that a channel has been associated with a particular channel button. On the second instance of pressing and holding, the currently playing channel replaces any previously stored channel. Illustrative embodiments of the present invention enhance a receiver having a number of buttons (i.e., either physical buttons or virtual buttons on a programmable touch-sensitive display screen) which are designated as preset buttons as follows: on the first instance of pressing and holding one of the preset buttons, a single channel is associated with the preset button; on a second and optionally subsequent instances of pressing and holding the preset button, additional channels can be associated with that preset button to produce a Mix Channel which alternates content segments (e.g. "songs") from all of the associated channels according to one of several possible methods. Alternatively, a separate mix button can be provided that, when activated, causes a mix channel to be output the comprises content from each of a set of channels (e.g., channels assigned to a bank of preset buttons, a set of channels designated by a user, or a set of channels selected by a content provider).

In accordance with another aspect of the present invention, navigation control inputs can be employed to allow a user to scroll forward and backward in the Mix Channel. The user is therefore advantageously exposed to an increased number of tracks, audio segments or other pieces of content in the buffered set of channels even when they are being presented simultaneously in the received stream(s).

In accordance with exemplary embodiments of the present invention, a Mix Channel is generated by buffering the content segments from at least the selected set of channels on a first-in-first-out (FIFO) basis. Buffer capacity can be managed by discarding segments in the set of channels that are currently being extracted from the received broadcast stream when the buffer reaches a predetermined threshold of content waiting to be consumed.

In accordance with exemplary embodiments of the present invention, the received broadcast stream can be a high speed broadcast stream having a baseband rate that is faster than a real-time baseband audio stream rate. The received broadcast stream can be a satellite digital audio radio service (SDARS) stream or a high definition radio broadcast stream. Further, at least one other stream can be received that is selected from the group consisting of a satellite radio broadcast stream, a high speed high definition (HD) radio stream, a real-time HD radio stream, a WiFi stream, and wireless stream. The other stream can comprise at least one audio program channel having audio segments, and the selected set of channels can comprise an audio program channel from the other stream.

In accordance with exemplary embodiments of the present invention, a set of channels can be selected based on user inputs indicating preferred program channels. Alternatively, a content provider, programming center or other entity can provide selected sets of channels (e.g., using in-band or out-of-band signaling to radio receivers or user devices) to be constituent channels of suggested or offered Mix Channels. Mix Channel configuration data can be stored at the radio receiver or user device comprising these selected sets of channels and optionally a Mix Channel number.

In accordance with exemplary embodiments of the present invention, selected content can be inserted into the Mix Channel among the segments from the buffered set of channels. The selected content can comprise commercials. Thus, different tiers of subscription service (e.g., different subscription rates) to receive at least one stream can be provided based on the amount of selected content that is inserted into the Mix Channels.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain embodiments of the present invention will be more apparent from the following description taken in conjunction with the accompanying drawings, in which:

FIG. 3 depicts five exemplary simultaneously broadcast channels (e.g., Ch. 40, Ch. 41, Ch. 46, Ch. 47 and Ch. 49) selected to build a personalized radio playlist and monitored and extracted favorite segments from non-selected channels from one or more source streams for building the personalized radio channel playlist in accordance with an exemplary embodiment of the present invention;

FIG. 4A depicts six selected channels for building a personalized radio channel playlist along with the respective stream bit rate for each channel, which are essentially the same group of channels described with reference to FIG. 3 with the exception of a Ch. 50 being extracted in lieu of implementing a favorites channel (CH. X) in accordance with an exemplary embodiment of the present invention;

FIG. 4B depicts a high speed stream (e.g., 360 kbps) constituted by songs from multiple channels that are transmitted faster than real-time (e.g., 6 times faster than 60 kbps) in accordance with an exemplary embodiment of the present invention;

FIG. 6 is an exemplary control interface on a radio receiver that provides navigation tools to see playlist song titles on a display and reverse and fast forward through the playlist, preview functions to optionally play shortened segments of each song/segment or the full-length song/segment, and user control inputs to specify favorite or banned items to be included or excluded from playlists in accordance with an exemplary embodiment of the present invention;

FIGS. 7 and 8 are exemplary displays on a radio receiver for viewing playlist information in accordance with an exemplary embodiment of the present invention;

FIGS. 12, 13 and 14 are respective air interface formats for providing a source stream to a radio receiver in accordance with an exemplary embodiment of the present invention;

DETAILED DESCRIPTION OF THE EXEMPLARY EMBODIMENTS

Figure 1:
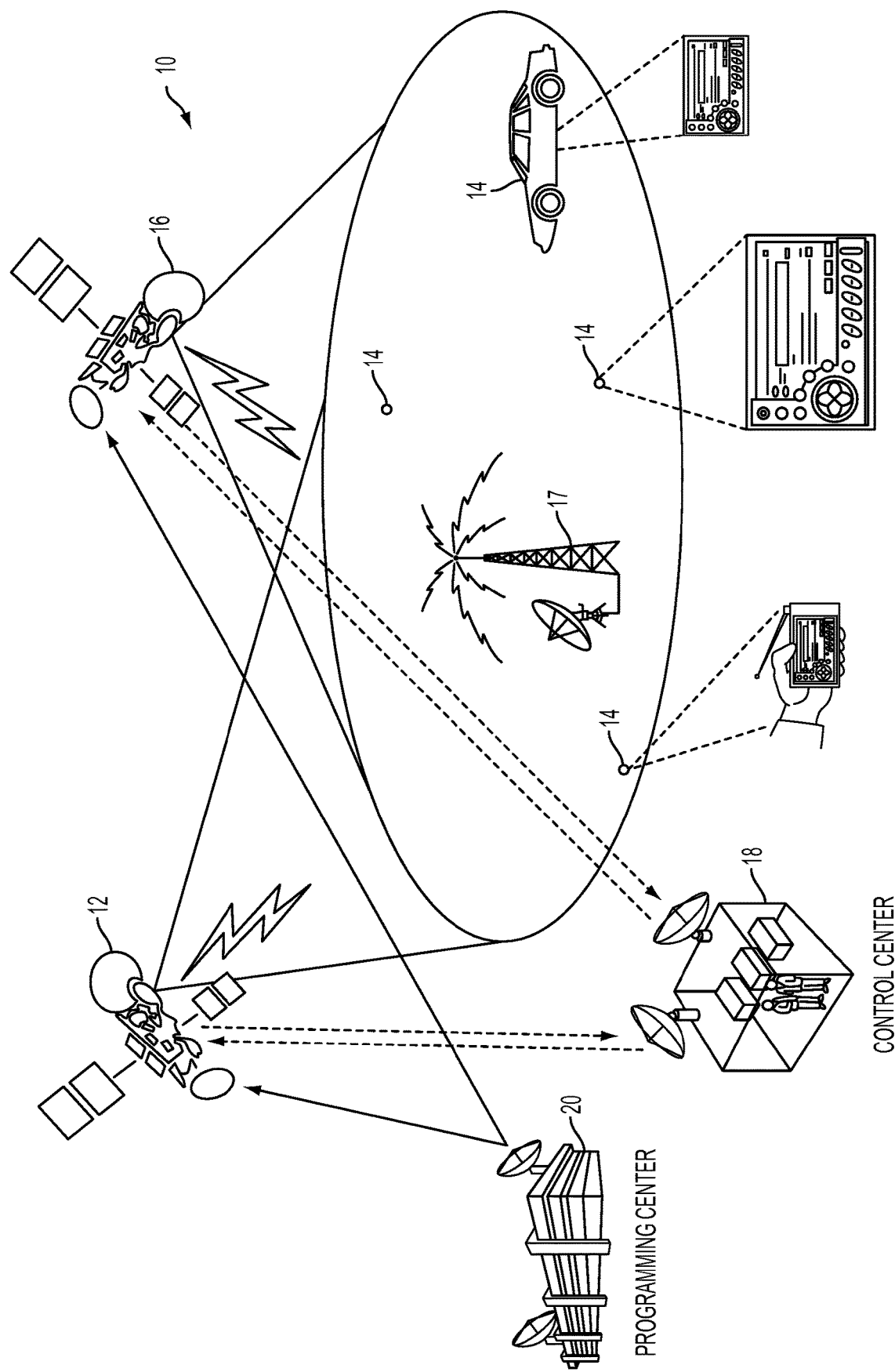
FIG. 1 depicts a multiplexed uplink broadcast transmission system for providing radio receivers with broadcast program channels from which to build personalized radio channel playlists in accordance with an exemplary embodiment of the present invention.

Several exemplary embodiments of the present invention are described herein. Briefly, the present invention provides a radio receiver configured to receive at least one stream comprising a plurality of different program channels. The radio receiver selects multiple channels from among the plurality of program channels and simultaneously buffers content from the selected channels as they are received. The buffered content is used to generate a personalized radio channel playlist in accordance with an illustrative embodiment to give a listener a customized, multiple-channel listening experience. Another example of a personalized radio channel playlist referred to as Mixed Channel operation is described below that can employ a more simplified user interface to playback a mixed or blended channel created using the buffered content and preset and tuning buttons available on most radio receivers to give a listener a customized, multiple-channel listening experience.

A radio receiver or other user device configured for Mix Channel operation receives at least one broadcast stream or streamed content (e.g., metadata, audio, and/or video) that comprises a plurality of different content channels. The radio receiver or user device designates multiple channels from among the plurality of broadcast or streamed channels and buffers content from the designated or otherwise selected channels as they are being received via the received stream. Multiple channels are received and buffered simultaneously. The buffered content is used for Mix Channel operation as described below, in addition to allowing a user to manually switch between channels, during a live listening mode (i.e., listening to content in a broadcast or streamed content stream as it is being received) and is to be distinguished from receivers that buffer content in nonvolatile memory for or deferred playback mode (e.g., listening to previously received and stored content at another time such as when a transmitted signal is not available or simply when deferred playback is desired by the user).

The content can be received from one or more streams and from diverse sources. In an illustrative example of Satellite Digital Audio Radio Service or SDARS or similar programming service, Mix Channel operation makes radio receivers, user devices and other products increasingly attractive to consumers, while also leveraging additional commercial value from a unique broadcast pipe of diverse curated content such as SDARS. The channels in the transmitted streams can be transmitted at a real-time rate, or can be provided as fast channels that are broadcast at a rate that is n times faster than the real-time rate, which builds a buffer of personalized content at a rate faster than the real-time rate.

In accordance with the Mix Channel embodiment of the present invention, the multiple selected channels can be preselected (e.g., plural channels that provide a selected genre of music or other set of channels recommended by a programmer or content provider) and provided to the radio receiver or user device to automatically generate a mixed playback channel for the user without the user having to enter specific channels via a user interface on the receiver. In accordance with another embodiment of the present invention, the multiple selected channels are specified by the user (e.g., a combination of favorite music channels and a news channel or comedy channel) via the receiver or user device or by another device that interfaces with the receiver.

Additional embodiments of the present invention pertaining to buffer management, playlist navigation and management, customization and connectivity features, and content insertion are described below.

Personalized Radio Channel Playlist

The exemplary embodiments are described herein with respect to a satellite digital audio radio service (SDARS) that is transmitted to the receivers by one or more satellites and/or terrestrial repeaters. It is to be understood that the source content stream(s) used to create a personalized radio channel playlist in accordance with the present invention can be broadcast using other content systems (e.g., other digital audio broadcast (DAB) systems or high definition (HD) radio systems), as well as other wireless or wired methods for signal transmission.

FIG. 1 depicts an illustrative system for transmitting at least one exemplary source stream to radio receivers 14. In the illustrative embodiment, the source stream provides SDARS.

FIG. 1 depicts a satellite broadcast system 10 which comprises at least one geostationary satellite 12, for example, for line of sight (LOS) satellite signal reception at receiver units indicated generally at 14. The satellite broadcast system 10 can be used for SDARS, for example. Another geostationary satellite 16 at a different orbital position is provided for diversity purposes. One or more terrestrial repeaters 17 can be provided to repeat satellite signals from one of the satellites in geographic areas where LOS reception is obscured by tall buildings, hills and other obstructions. It is to be understood that different numbers of satellites can be used, and that satellites in other types of orbits can be used.

As illustrated in FIG. 1, a receiver unit 14 can be configured for stationary use (e.g., on a subscriber's premises), or mobile use (e.g., portable use or mobile use in a vehicle), or both. A control center 18 is provided for telemetry, tracking and control of the satellites 12 and 16. A programming center 20 is provided to generate and transmit a composite data stream via the satellites 12 and 16 which comprises a plurality of payload channels and auxiliary information.

With reference to FIG. 1, the programming center 20 is configured to obtain content from different information sources and providers and to provide the content to corresponding encoders. The content can comprise both analog and digital information such as audio, video, data, program label information, auxiliary information, and so on. For example, the programming center 20 can provide SDARS having on the order of 100 different audio program channels to transmit different types of music programs (e.g., jazz, classical, rock, religious, country, and so on) and news programs (e.g., regional, national, political, financial, sports). The SDARS can also provide emergency information, travel advisory information, educational programs, and the like.

Figure 2:
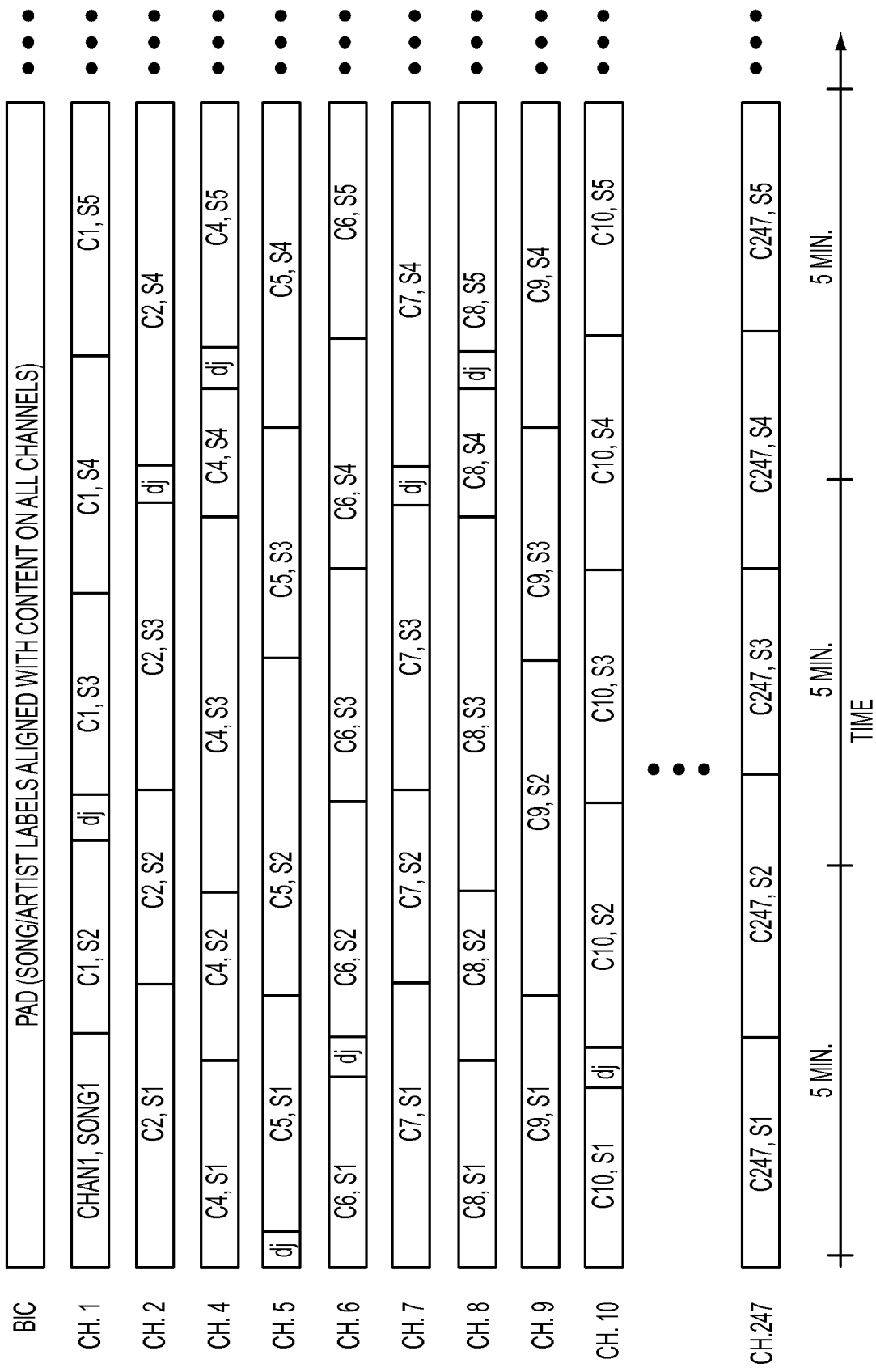
FIG. 2 depicts different program channels in a source stream which can be buffered to monitor and select for favorite content to build personalized radio channel playlists, or for Mix Channel operation, in accordance with exemplary embodiments of the present invention.

FIG. 2 illustrates different service transmission channels (e.g., Ch. 1 through Ch. 247) providing the payload content and a Broadcast Information Channel (BIC) providing the auxiliary information. These channels are multiplexed and transmitted in a composite data stream that can be a source stream for a radio receiver 14 constructed in accordance with exemplary embodiments of the present invention. The illustrated payload channels comprise segments such as songs indicated, for example, as S1, S2, S3 and so on) and disc jockey (DJ) talk segments indicated as "dj" in FIG. 2.

The BIC includes auxiliary information useful for services selection and non-real-time control. The present invention is characterized by the additional advantages of leveraging this auxiliary information, which is already available in an SDARS composite data stream, for additional beneficial uses. First, the auxiliary information comprises data (e.g., Program Associated Data (PAD) described below) to facilitate locating the beginnings of songs for buffering and locating dj segments for exclusion from the personalized channel. Second, the auxiliary information in the composite data stream (e.g., PAD) allows a multi-channel demultiplexer in the receiver 14 to locate and buffer the selected channels, as well as favorite songs from other non-selected channels. The auxiliary information also allows a multi-channel demultiplexer in the receiver 14 to exclude from the personalized channel any disliked songs identified by the listener. The auxiliary information that relates music genres, channels and songs/artists in an SDARS is therefore a readily available tool with which to navigate the diverse content provided via SDARS for achieving a personalized listening experience. By contrast, extensive metadata must be procured by providers of conventional personalized radio services to enable selection of content for a listener.

More specifically, the BIC can be used to display the station name of available services, a directory to the contents of the composite data stream, as well as PAD. PAD can comprise data associated with a channel such as a song name or label, artist name or label, service ID (SID), and program ID (PID), among other data. The service ID is an identifier (typically 8 bits) which is associated with a specific SDARS provider radio service (e.g., for XM Satellite Radio, the SID can identify service channels such as Top Tracks, CNN News, The Comedy Channel, and the like) and is used identify the specific service channel at the receivers 14. The program ID comprises data relating to the identity of a unique content segment such as a song on a specific CD, for example. Thus, a change in PID and/or PAD can indicate to a receiver 14 the beginning of a song for that channel and facilitate buffering of the song for the personalized radio channel.

The present invention is advantageous since the channels are partitioned into segments, and the beginnings of segments in the multiple selected channels are located for buffering to generate the personalized channel. Thus, complete segments or songs are buffered for playback on multiple, simultaneously received channels that have been selected to create the personalized radio channel playlist. This is in contrast with scanning operations on conventional radios that often bring a listener to the middle or near end of a song that had not been buffered.

Figure 3:
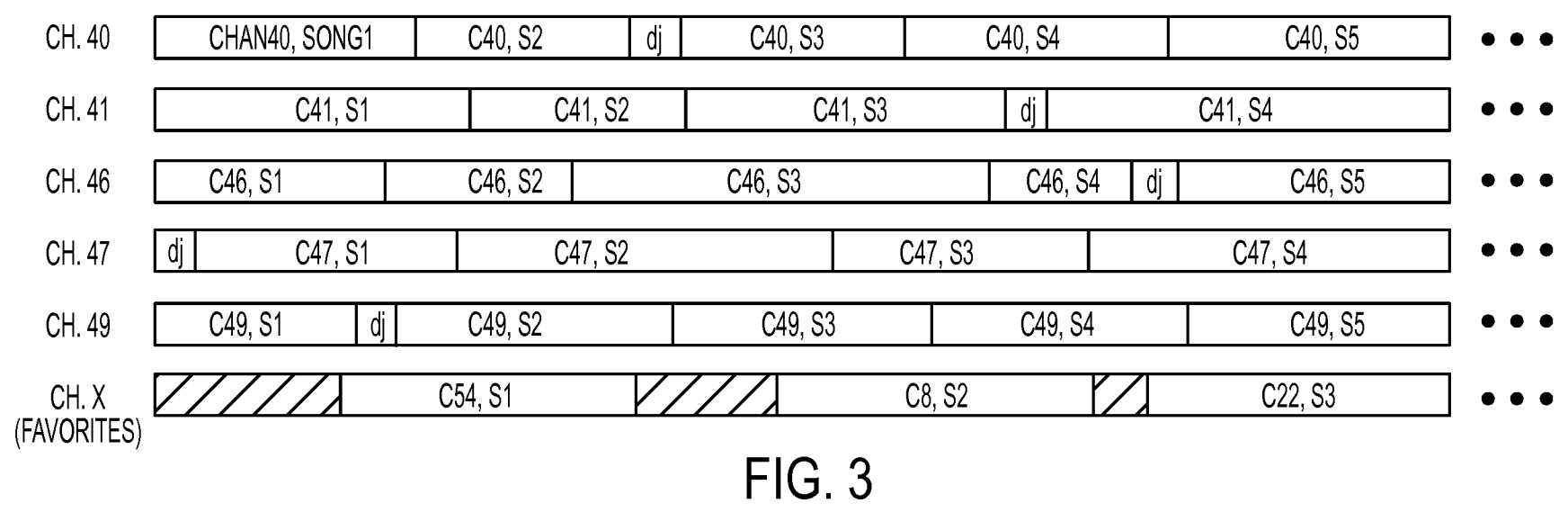

FIG. 3 depicts five exemplary simultaneously broadcast channels (e.g., Ch. 40, Ch. 41, Ch. 46, Ch. 47 and Ch. 49) from one or more source streams. In accordance with an exemplary embodiment of the present invention, the five channels are selected for essentially simultaneous extraction from the received source stream(s) and buffering in a memory 70 (e.g., a static random access memory (SDRAM)) in the radio receiver 14 for creating a personalized radio channel playlist. It is to be understood that a larger or fewer number of channels can be used to create the personalized radio channel playlist.

As stated above, one (or more) of extracted and buffered channels can optionally be a favorite channel. More specifically, the radio receiver 14 is programmed to receive user inputs indicating favorite songs or artists and to save some of the auxiliary information for those songs and/or artists as user favorites data. For example, as described below, a radio receiver 14 can be provided with a Thumbs Up button 32 that a user can depress while listening to a song. The radio receiver 14, in turn, stores user favorites data comprising artist and/or song information obtained from the BIC pertaining to that song. In accordance with an exemplary embodiment of the present invention, the radio receiver 14 monitors the BIC of the received stream(s) for content matching the user favorites data and then extracts and buffers the content for building the personalized radio channel playlist. The monitored channels encompass non-selected channels for the purpose of building the playlist and therefore increase the user's exposure to desirable content in the received source stream to beyond the selected multiple channels.

FIG. 4A depicts six selected channels for building a personalized radio channel playlist, which are essentially the same group of channels described with reference to FIG. 3 with the exception of a Ch. 50 being extracted in lieu of implementing a favorites channel. With regard to FIG. 4A, a playlist is derived from simultaneous reception of 6 real-time music streams. In the illustrated embodiment, the real-time streams are each 60 kilobits per second (kbps) for a total of 360 kbps of content from which to generate a playlist. Alternatively, the source stream can be a high speed stream (e.g., 360 kbps) constituted by songs from multiple channels that are transmitted faster than real-time (e.g., 6 times faster than 60 kbps), as shown in FIG. 4B.

Figure 5:
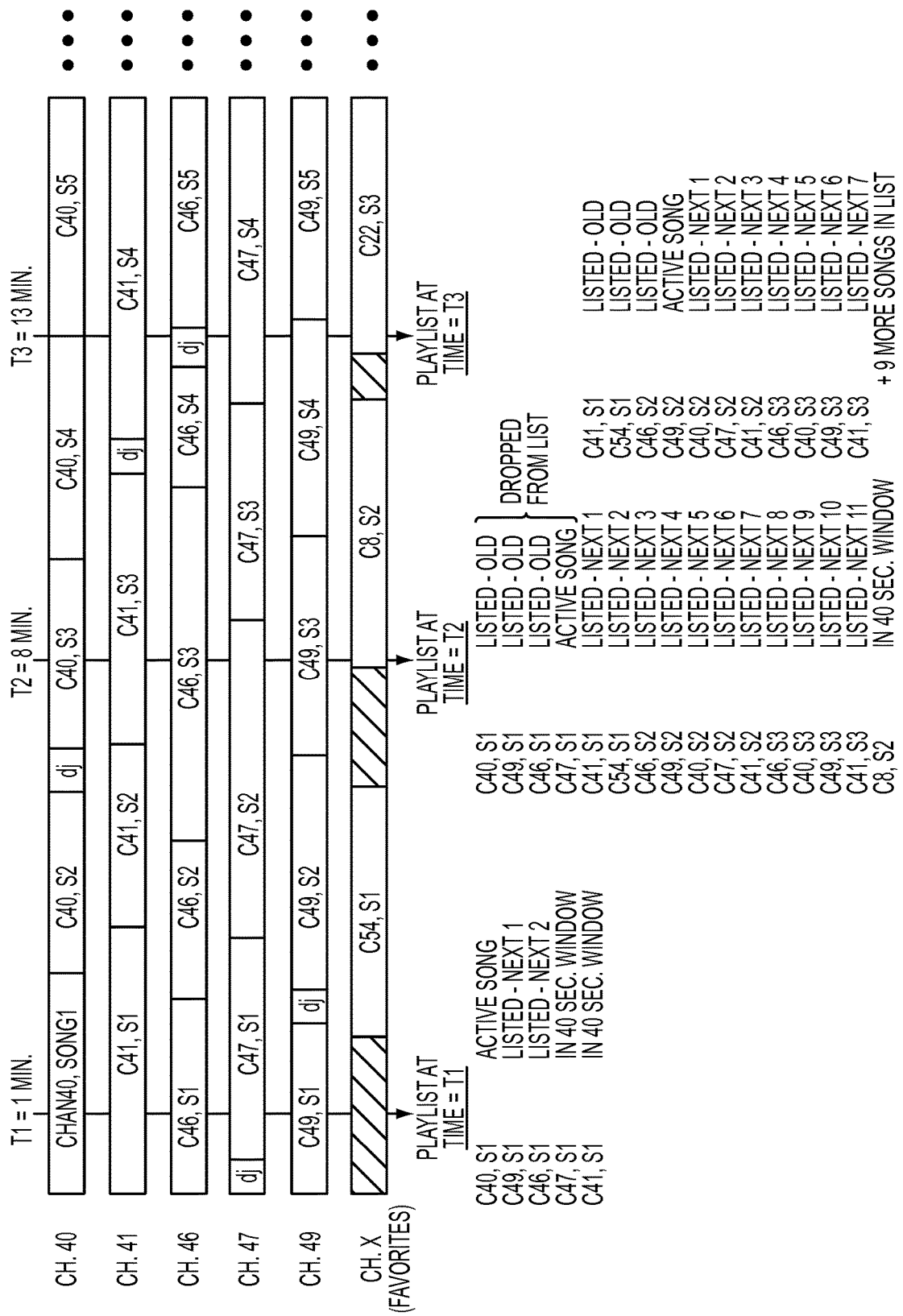
FIG. 5 depicts an illustrative playlist and its constituent buffered selected channels available at different times after power up of the radio receiver or selection of a different personalized radio channel configuration in accordance with an exemplary embodiment of the present invention.

In accordance with an exemplary embodiment of the present invention, the personalized channel playlist is generated by time division multiplexing the songs from up to six channels, for example, which enables the playlist to grow faster than real-time. FIG. 5 depicts the playlist at different times after power up of the radio receiver 14 or selection of a different personalized radio channel configuration (e.g., at one minute (T1), at 8 minutes (T2) and after 13 minutes (T3)). The radio receiver 14 preferably monitors the BIC for song or segment changes to locate the beginnings/ends of the songs/segments before buffering. As illustrated in FIG. 5, songs/segments are preferably buffered in the sequential order of their respective start times within the channels being buffered. Further, the radio receiver 14 is programmed to wait a selected time period (e.g., 40 seconds) after the start of a segment before buffering to determine (e.g., from the BIC) whether that segment contains DJ chatter or other content to be ignored and not added to buffer. For example, the radio receiver 14 can be configured to determine that a PAD label for a segment indicates that segment to be a song as opposed to a commercial that is ignored. As shown at time T1, the songs S1 on respective ones of channels Ch. 49 and CH. 46 are listed in sequential order in accordance with their start times following the active Song 1 on Ch. 40. The songs S1 on channels Ch. 47 and 41, however, are preferably not queued in the buffer until about 40 seconds after their start times. Not including short audio segments in the playlist provides one method to remove DJ chatter, commercials or other undesired content.

Assuming that radio receiver 14 start up has occurred or another personalized radio channel configuration has been selected just prior to T1, Song 1 on Ch. 40 has the first start time, followed by Song 1 on Ch. 49 and so on. These songs are preferably buffered by the radio receiver 14 in that order. Thus, at power on, the radio receiver 14 looks for a label change to indicate the start of a song on one of the multiple selected channels and begins building buffered playlist. After power down, the buffer is preferably erased. A flash memory 78 can be used to store buffered playlist segments from the most recent past use for retrieval at power up. A user can switch to another personalized radio channel configuration and start buffering for that selected configuration immediately without a power down operation. The newly buffered segments will overwrite those segments extracted using the previous personalized radio channel configuration.

With continued reference to FIG. 5, the buffered songs that constitute the personalized radio channel playlist are preferably added and dropped on a first-in-first-out (FIFO) basis. As stated above, at playlist start-up (i.e., at power up or initialization of a new playlist configuration, the radio receiver 14 will monitor for the first song/segment with the first start time after start up and then begin building the playlist buffer). As indicated at time T3 in FIG. 5, several of the songs that were available in the playlist at time T2 have been fully or partially played and subsequently dropped at time T3 and more songs have been added.

With reference to FIGS. 6, 7 and 8, the radio receiver 14 provides the user with the tools to see playlist song titles on a display 23, with preview functions to optionally play shortened segments of each song/segment or the full-length song/segment, and user control inputs to reverse and fast forward through the playlist. The exemplary control/user interface 22 depicted in FIG. 6 can be configured as soft keys and/or fixed keys on the radio receiver 14. Two exemplary display screens are depicted in FIGS. 7 and 8, respectively, for providing a single song data display screen and a song list display screen on a radio receiver display 23. The screens depicted in FIGS. 7 and 8 preferably constitute Display Modes A and B, respectively. Both Display Modes A and B provide common information such as the name of the personalized radio channel playlist, the channels from which the playlist content is extracted, playlist song titles and artists, the number of songs in the buffer queue, and the duration of time left before the song currently being played back to the user is changed. The Display Mode A displays the same information regarding the currently playing song in a larger format.

The song list display screen in FIG. 8 lists the song from the personalized radio channel playlist that is currently being played back to the user, as well as the previous song in the buffer and the next few songs in the buffer. The control interface 22 shown in FIG. 6, preferably comprises a next song button 24 and a previous song button 26 for scrolling through the list of songs shown on the song list screen of FIG. 8. Since the number of queued songs may be too large for listing in one display screen, the tuning dial 28 can be programmed to permit a user to change the display of queued songs (e.g., scroll through the next songs in the queue after or before the six songs listed in the screen shown in FIG. 8 depending on which direction the dial 28 is turned).

As discussed in connection with FIG. 5, the playlist is continually changing over time as more songs from the selected channels are added to the buffer and previously buffered songs are dropped from the buffer on a FIFO basis. Thus, the number of songs that can be skipped in the reverse direction on the playlist is limited (e.g., as many a three songs) as these songs are overwritten in the buffer. Nonetheless, the reverse operation of the radio receiver 14 is an improvement over conventional online personalized radio services that do not permit reverse or back up operations to play prior items on a generated playlist during preview, nor during full playback without first purchasing the item.

With continued reference to the control interface 22 illustrated in FIG. 6, a display mode button 30 is provided to toggle between the different display mode screens (e.g., between a Display Mode A as shown in FIG. 7 and a Display Mode B as shown in FIG. 8) to display all songs in the buffer or current song being previewed or listened to in full. Buttons are also provided to allow a user to indicate, when listening to a song being played back by the radio receiver 14, that the song should be added to the user favorites data for monitoring and extraction via a favorites channel as described above, or be blocked from being queued in the playlist. Thus, the user can employ the "Thumbs Up" and "Thumbs Down" buttons 32, 34 to build a filter using customer-created lists of favorite songs or artists when generating a personalized radio channel playlist at the radio receiver 14.

In order to expose the user to each song being played on the subset of channels in the currently selected personalized radio configuration, songs or talk segments in the buffered playlist are truncated in order to reduce the average time each segment is played. For example, if the playlist has grown to 10 or more songs, each new song may be played for 45 seconds and then terminated so that the next song in the playlist can start. During the song, the user has the option to listen to the full song or back up in the playlist to listen to a previous song. A button 36 is provided to enable a user to select playback of a full-length version of the currently playing song. The user may be provided with an audible alert around 5 or 10 seconds before a song is terminated as a reminder to select playback of the full length version if desired. A user can opt to play full-length versions of all songs in the playlist but would either lose buffered content that is replaced with new content before being previewed or lose new content that could not be buffered when the buffer is full, depending on the buffer management implementation. When playing the full length version of the song, the user may optionally save the song to a separate favorite song file in non-volatile memory (not shown).

As shown in FIGS. 7 and 8, the amount of time left in a currently playing song (i.e., for preview or full length playback) is provided as a countdown timer 38 on the display 22 to inform a user of the time remaining before the current song is truncated and playback of the next song in the queue begins. As described in more detail below, an algorithm for the countdown timer 38 can be a phase locked loop to ensure a selected number of songs remain in the buffer. For example, timer 38 can be speed up (e.g., less preview time per stored segment) when the buffer has grown to a selected amount or the number of channels used to create the personalized radio channel has increased (e.g., using 10 channels instead of 5), or slowed down (e.g., more preview time per stored segment) when a selected number of Fast Forward operations have occurred. This countdown function 38, which truncates the songs in the playlist for preview purposes, may be enabled and disabled by the subscriber.

For example, once the number of "next songs" (e.g., see songs queued after an active song in FIG. 5) in the buffer builds to a predetermined number of songs (e.g., 10 songs), the countdown timer 38 in the radio receiver 14 is initiated. If the number of channels is 5 and the average song is 3.5 minutes, the initial value of the countdown timer can be 210 seconds/5=42 seconds. This value may be set to a predetermined or otherwise fixed value or, as discussed previously, increased and decreased as the number of next songs in the buffer decreases or increases above or below predetermined thresholds. The time value is adjusted in order to maintain a predetermined number of next songs in the buffer.

In order to stop occasional repetition (e.g., buffering the same song being played on different channels), a duplicate filter can be deployed in accordance with an exemplary embodiment of the present invention. Each time a song is listed in the playlist, the same song is added to a blocked song list stored in the radio receiver 14 for the next 10 songs or other predetermined number of songs. This insures at least 10 different songs are presented in the playlist between any 2 repeated songs.

With continued reference to FIG. 6, a menu button 40 provides a user with other functions such as, for example, a purchase button for initiating a transaction to acquire a song in the playlist. The exemplary control interface 22 depicted in FIG. 6 can also have PreSet keys 42, 43, 44, 45 for selecting channels for individual playback or for selecting other multi-channel configurations. A Show Keypad button 41 can also be provided to display numeric soft keys to provide a user with a convenient method of entering numeric information such as a desired channel number.

As stated above, an exemplary embodiment of the present invention uses selected content from a broadcast stream (e.g., satellite or terrestrial delivery) based on personalized settings to build a local personalized content database, that is, a user selects multiple channels from among all of the channels that are broadcast simultaneously in a source stream for simultaneous buffering in a personalized radio channel playlist in a radio receiver 14. Thus, a user is exposed to the content on the multiple channels as it is received.

Another embodiment of the present invention provides for the autogeneration of a personalized radio channel playlist based on selection of one of several offered genre-based multiple-channel personalized radio configurations. For example, the different genre-based multi-channel personalized radio configurations can be broadcast in a control data channel that is separate from the individual audio channel streams, where each configuration includes a list of individual channels for the radio receiver 14 to simultaneously extract. These preset configurations are presented to the subscriber as special "fast track" channels, such that the subscriber can "tune" to them without requiring additional interaction. A user can change between personalized radio configurations and the radio receiver 14 will immediately commence buffering based on the channels in the newly selected personalized radio configuration without requiring a power down operation.

In addition, an embodiment of the present invention allows a user to select which channels are to be included in a customized personalized radio configuration as opposed to using a preset configuration. One of the selected channels in the configuration can be a favorites channel, that is, songs or segments that are extracted from non-selected channels because they have been identified by the user as a favorite (e.g., using the thumbs up button 32 during a previous reception of the song or segment) and stored in a favorites list at the radio receiver 14. The radio receiver 14 is also configured to allow users to specify their favorite channels for building personalized radio channel playlists.

Figure 9:
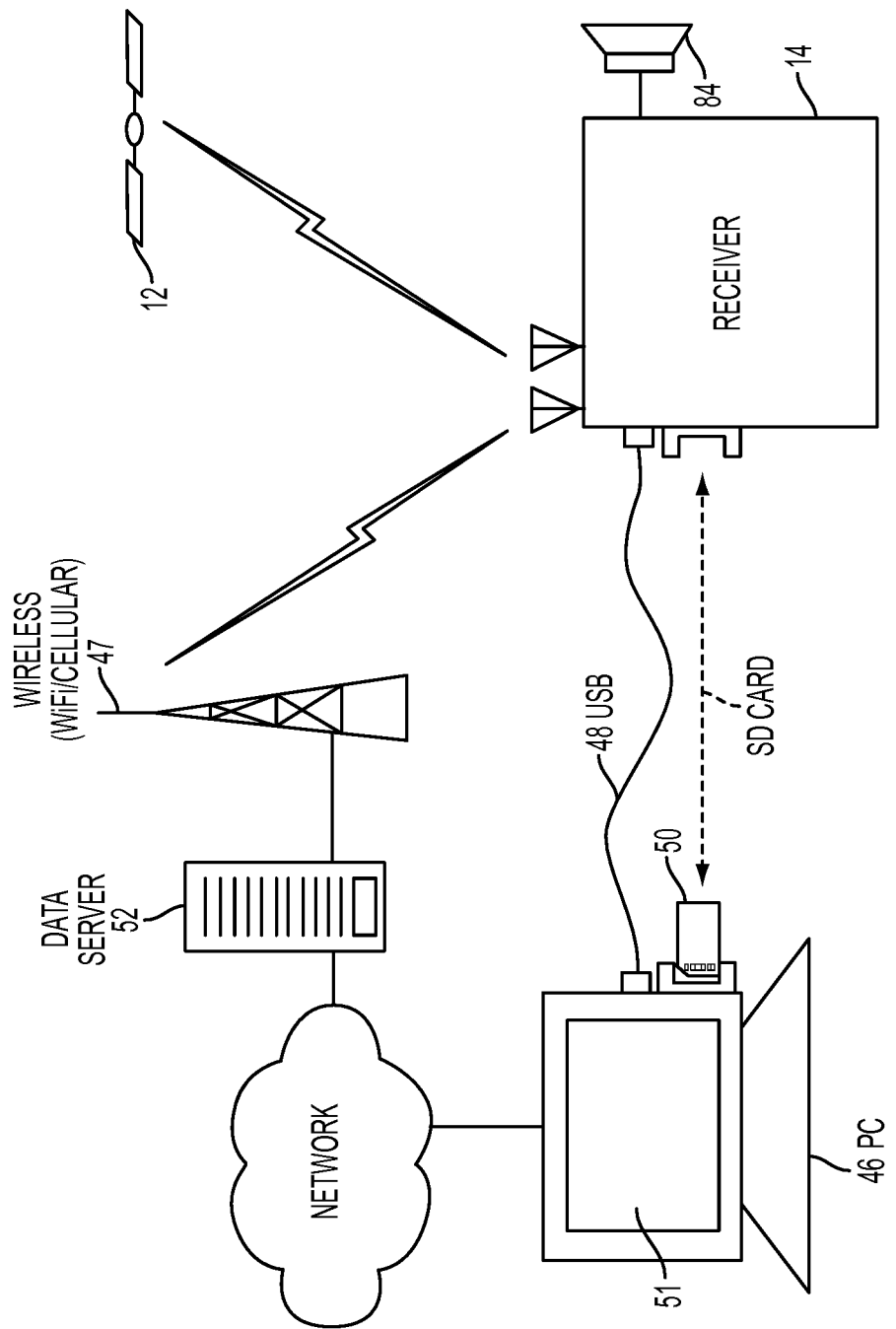
FIG. 9 depicts different optional methods for connecting a radio receiver having a multi-channel memory for buffering personalized radio channel playlists to other computing devices in accordance with an exemplary embodiments of the present invention.

Users have the options of entering favorite song/segment and/or channel information via the user interface 22 on the radio receiver 14 or via a personal computer 46 to which the radio receiver 14 can be connected in accordance with other embodiments of the present invention that facilitate customization of personalized radio channel configurations and sharing of customized playlist building configurations and favorites information (e.g., with friends and family members who enjoy similar broadcast content and may want to build similar personalized radio channels). With reference to FIG. 9, a radio receiver 14 having a multi-channel memory for buffering a personalized radio channel playlist is shown connected to a computing device 46 (e.g., a personal computer (PC)) using a number of different methods. The radio receiver 14 can transfer personalized radio channel configurations, lists of favorite channels, lists of favorite or banned songs and other multi-channel customization parameters to the computing device and receive similar information therefrom using one or more of these methods.

For example, a direct USB connection 48 can be provided between the radio receiver 14 and the PC 46. This is particularly useful if the radio receiver 14 is portable. A radio receiver 14 that is a dedicated car-installed unit can have a removable flash memory card 80 (e.g., a micro SD card) on which customized personalized radio configuration information is stored and corresponding interface. The micro SD card can then be used with a PC 46 or other car-installed radio receiver 14. Further, wireless technology 47 such as WiFi, WiMax and cellular interfaces can be used to call a radio receiver 14 with customized personalized radio information, and to scan and receive the configuration information for uploading through the wireless-enabled radio receiver 14 to a PC 46 or other player. The radio receiver 14 can optionally be connected wirelessly to a server 52. The channel configurations can be transferred or synchronized between the PC 46 and the radio receiver 14 as needed.

Figure 11:
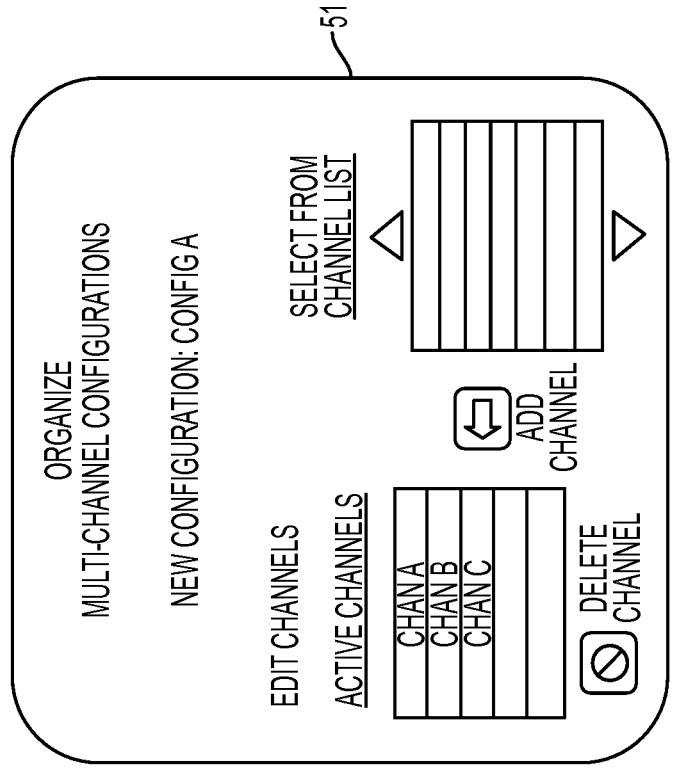
FIGS. 10 and 11 are illustrative web interface window for customization of personalized radio configuration parameters in accordance with an exemplary embodiment of the present invention.
Figure 10:
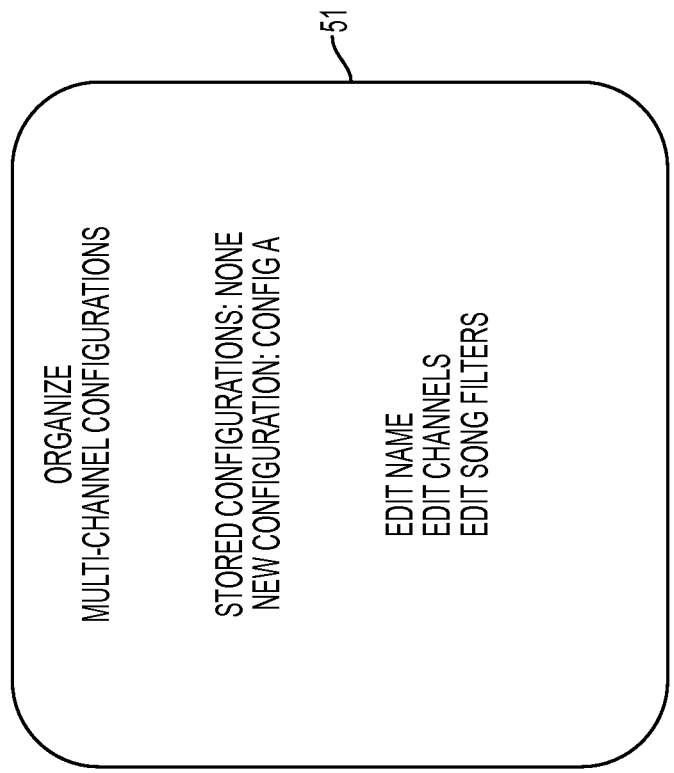

In accordance with another embodiment of the present invention, a web interface can be provided with user screens to allow users to create configurations and lists of favorite artists and songs for building a personalized radio channel that can be transferred to a device using, for example, a direct USB interface 48 or microSD card 50 or other portable memory device. FIGS. 10 and 11 are exemplary PC multi-channel customization screens or a PC display 51. FIG. 10 depicts a "Main Configurations" window that lists any currently stored personalized radio channel configurations and options for creating a new configuration (e.g., edit name, edit channels that constitute the new configuration, and edit song filters). FIG. 11 is an "Edit Channels" window that is displayed when the Edit Channels option is selected in the window depicted in FIG. 10. Active channels can be selected from a scrolling channel list that can include all broadcast channels in a source stream or favorite channels stored in the radio receiver 14. It is to be understood that other source streams can be selected from which channels can be selected and added to the active channels list.

An "Edit Song Filters" window (not shown) can be displayed when the Edit Song Filters option is selected in the window depicted in FIG. 10. The "Edit Song Filters" window is similar to the "Edit Channel" window in FIG. 11 in that the user may select specific songs or artists from a comprehensive list to add to either the "Favorites List" or the "Do Not Play List". As described above, the "Favorites List" is used for a background scan of all non-selected channels and, if a match is found, that song or artist is extracted and added to the playlist. The "Do Not Play List" filters the listed songs or artists out of the playlist.

In accordance with another embodiment of the present invention, the web interface 46 can be used to provide listener's audit information to the programming center 20. For example, patterns of listeners can be determined based on their selected configurations (e.g., music-genres, thumbs up/down operations 32, 34 and corresponding favorites and banned segments lists) which can be uploaded from their PCs 46 to the programming center 20 via the web.

As stated above, the present invention allows users to build personalized radio channel playlists from selected channels in one or more broadcast source streams such as an SDARS transmission. FIG. 12 depicts an exemplary over-the-air protocol frame format for an illustrative source stream in which the payload channels and auxiliary information channel(s) are multiplexed for transmission to receivers 14. This frame format is based on a 432 millisecond frame where each frame includes a frame header 103 and is subdivided into 8 kilobit per second sub-channels 102. These sub-channels 102 can be dynamically grouped to form higher bit rate payload channels 104 (i.e., Channels 1 through n which may include the BIC). The payload channel 104 provides the necessary bandwidth to transport a high-quality digital audio signal to the listener. When a listener changes program channels on a receiver 14, the receiver 14 extracts a different payload channel 104 corresponding to that program channel from each frame.

FIGS. 13 and 14 depict respective exemplary embodiments for additional air interface formats. FIG. 12 illustrates a time division multiplex of multiple real-time audio streams. FIG. 13 depicts an air interface for a single channel (e.g., Ch. 1) audio stream that is transmitted faster than real-time. FIG. 14 depicts an air interface for multiple single channel audio streams that are transmitted faster than real-time (e.g., Ch. 1, Ch. 2, . . . , Ch. n that are transmitted, respectively at rates n, m, . . . , z times faster than real-time). As described in connection with FIGS. 4B and 5, a channel transmitted using either of the air interface formats depicted in FIGS. 13 and 14 builds a personalized playlist more quickly that the air interface format depicted in FIG. 12.

Figure 15:
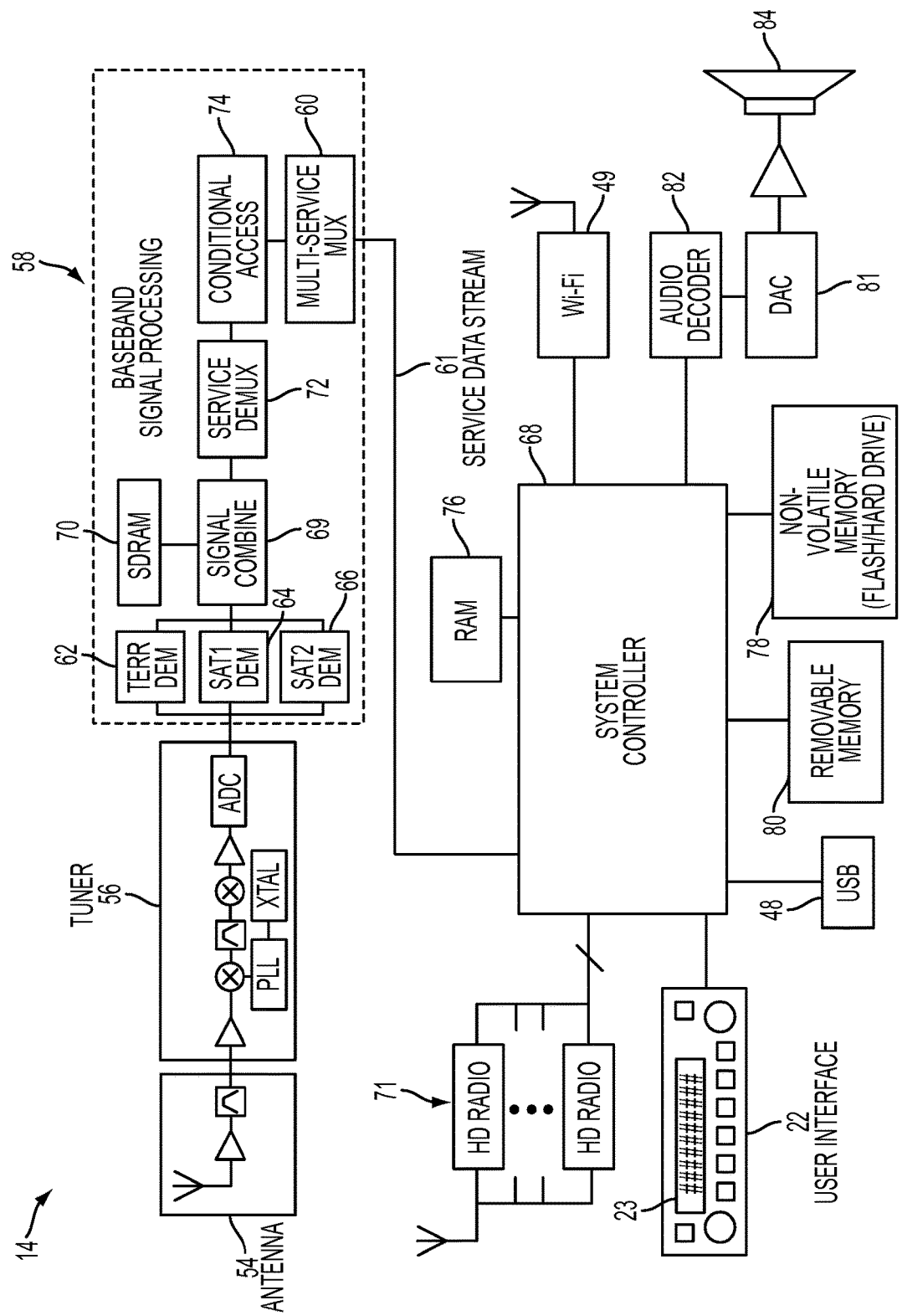
FIG. 15 block diagram of a receiver in accordance with an exemplary embodiment of the present invention.

An exemplary receiver 14 is depicted in FIG. 15. The radio receiver 14 preferably comprises an antenna 54 for receiving, for example, an SDARS signal and/or other broadcast streams, a tuner 56, baseband signal processing components indicated generally at 58, a system controller 68, a multi-service multiplexer MUX 60 and memory, among other components.

With further reference to FIG. 15, the receiver 14 preferably comprises three receiver arms for processing the SDARS broadcast stream received from two satellites 12, 16 and a terrestrial repeater 17, as indicated by the demodulators 62, 64, 66, that are demodulated, combined and decoded via the signal combiner 69 in combination with the SDRAM 70, and demultiplexed to recover channels from the SDARS broadcast stream, as indicated by the signal combining module 69 and service demultiplexer module 72. Processing of a received SDARS broadcast stream is described in further detail in commonly owned U.S. Pat. Nos. 6,154,452 and 6,229,824, the entire contents of which are hereby incorporated herein by reference. A conditional access module 74 can optionally be provided to restrict access to certain demultiplexed channels. For example, each receiver 14 in an SDARS system can be provided with a unique identifier allowing for the capability of individually addressing each receiver 14 over-the-air to facilitate conditional access such as enabling or disabling services, or providing custom applications such as individual data services or group data services. The demultiplexed service data stream 61 is provided to the system controller 68 from a multi-service multiplexer 60. In accordance with an embodiment of the present invention, the radio receiver 14 is provided with a memory (e.g., RAM 76 or 78) or a part of a memory that is a multi-channel memory for buffering the selected received and demultiplexed channels of the currently active personalized radio channel configuration.

The RAM 76 connected to the system controller 68 in FIG. 15 is used for buffering. Also, the system controller 68 may be enabled to provide a second level multiplexer to multiplex content from the satellite multi-service multiplexer, an HD receiver bank 71, a WiFi link 49, removable memory 80 and/or the non-volatile memory 78. Some specific examples include building the playlist from (1) one or more high speed HD radio stream(s), (2) multiple real-time HD radio streams, (3) a combination of high speed and real-time HD radio streams, (4) a high speed WiFi stream, (5) a combination of satellite radio stream(s), HD receiver stream(s), WiFi stream(s) and other wireless streams, or any of the previous source stream configurations in combination with locally stored content segments.

With further reference to FIG. 15, the system controller 68 receives a service data stream 61 from the multi-service MUX 60 and can provide selected, demultiplexed audio, speech and the like to an audio decoder 82 and digital to audio converter (DAC) 81 for playback via a speaker 84. The selected content can be based via user inputs to a user interface 22 as shown. The user interface 22 comprises a display 23 and input devices (e.g., buttons, dials) for selecting received program channels for playback and navigating buffered content in the playlist. For example, a user can opt to select one of the received channels for playback in a default playback mode, or select a personalized radio playback mode and use the display and buttons described with reference to FIGS. 6-8 to navigate and listen to segments from multiple buffered channels available in the playlist stored in the SDRAM based on the current personalized radio configuration.

With continued reference to FIG. 15, the radio receiver 14 can have a USB port 48 to allow settings and other operating data to be transferred between another device and the receiver 14 such as personalized radio multi-channel customization parameters as described above. A removable memory 80 and interface can also be provided such as a micro SD card to allow also transfer personalized radio multi-channel customization parameters, or a cartridge on which other buffered content is stored (e.g., acquired content, MyMusic content) for playback when reception of the live source stream is not available as described in commonly-owned U.S. patent application Ser. No. 11/239,642, filed Sep. 30, 2005. Finally, non-volatile memory 78 and random access memory 76 are preferably provided in the radio receiver 14 for use by the system controller 68 (e.g., for storing program code).

Figure 16:
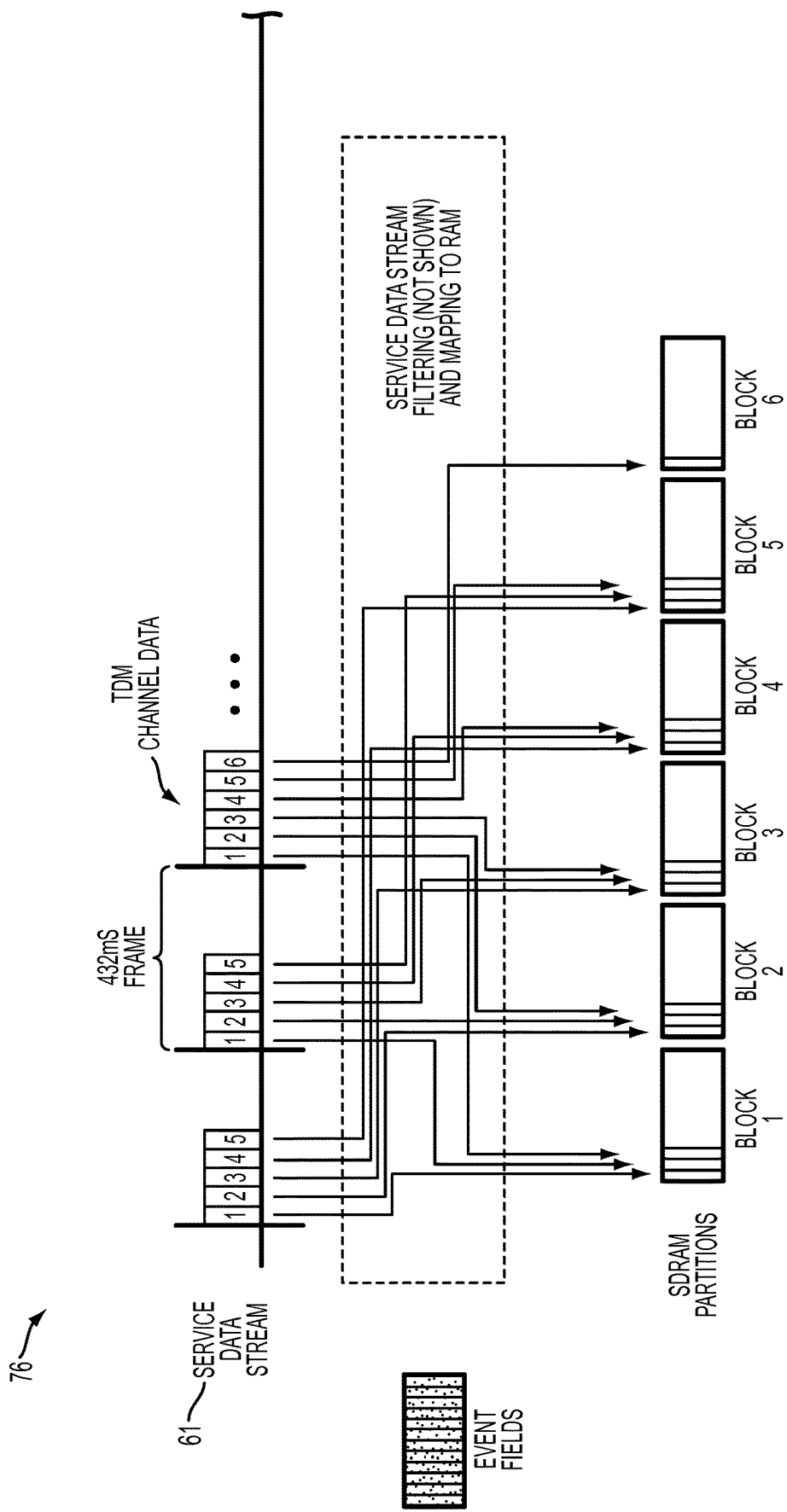
FIG. 16 illustrates buffering management in accordance with an exemplary embodiment of the present invention.

A RAM 76 for providing a multi-channel memory in accordance with an exemplary embodiment of the present invention is shown in FIG. 16 which could be implemented in any R/W memory technology such as a static RAM, SDRAM, DDRAM, embedded RAM or non-volatile memory block. The RAM device 76 is partitioned into 6 dedicated channel blocks indicated in FIG. 16 as Block 1 through Block 6. As frames of source data stream are received, each of 6 channels in a particular personalized radio channel configuration are extracted and mapped to a separate RAM memory block and recorded in circular buffer format, with the exception that buffering shall momentarily halt to prevent overwriting previous content in the active playlist or writing content which is listed on the do-not-play list. Pausing playback of a playlist song is allowed, as well as reverse or backtracking operations (e.g., limited to 3 songs).

Figure 17:
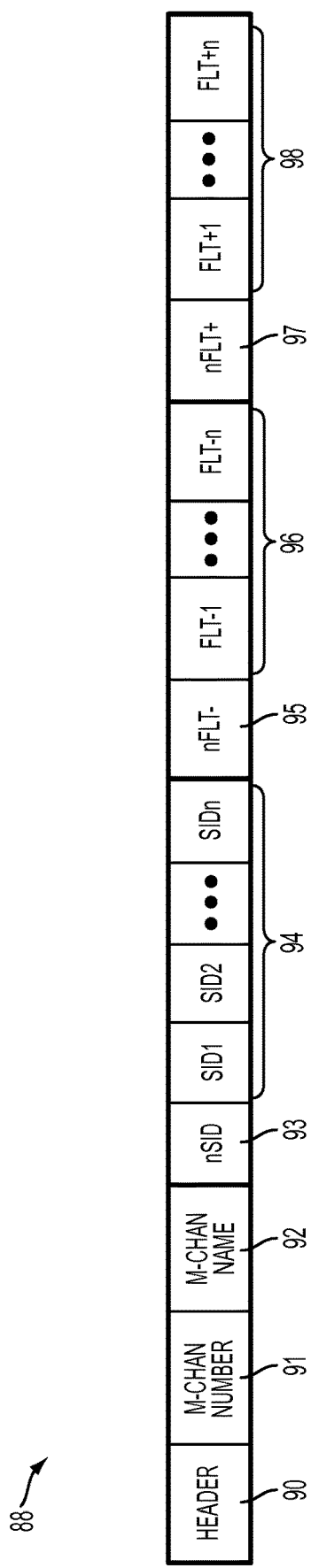
FIG. 17 illustrates a broadcast multi-channel configuration message in accordance with an exemplary embodiment of the present invention.

In accordance with another embodiment of the present invention, predetermined personalized channel configurations can be broadcast to receivers 14 and presented to users to simplify accessibility to the service. BIC messages 88 can have different formats and functions. The BIC can be used, in accordance with an exemplary embodiment of the present invention, to send different personalized channel configurations to receivers 14 (e.g., a different group of preselected channels that constitute a preset personalized channel configuration). An exemplary BIC message 88, that is, a broadcast multi-channel configuration message, is shown in FIG. 17. The broadcast multi-channel configuration message 88 enables the service provider to define tunable presets which contain channel configurations and filters necessary to enable a receiver 14 to automatically configure itself to build a playlist in accordance with the present invention. The receiver 14 receives the broadcast configuration message 88 and enables the subscriber to tune to the configuration by presenting a special multi-channel name and number or genre preset or equivalent in either the normal channel line-up or in a separate category or tuning window. Different multi-channel configurations may be broadcast based on genres, music/talk mixes, and so on. The message 88 can comprise the following fields:

Header 90: a message header identifying the message 88 as a multi-channel definition message;

M-Chan Number 91: the channel number to tune the radio receiver 14 to in order to receive this playlist configuration;

M-Chan Name 92: the name to display for this playlist configuration;

nSID 93: the number n of Service IDs (SID) or channels to simultaneously extract to build this playlist;

SIDx 94: each service listed separately which is to be extracted;

nFLT− 95: the number of specific songs or artists to exclude from the playlist for this configuration FLT−x 96: each specific song or artist listed separately which will be excluded from the playlist (note: this field may be in the form of song/artist IDs or in text format);

nFLT+ 97: the number of specific songs or artists which will be used to search other channels (e.g., if one of these songs or artists are found on another channel, that song or artist will be extracted and added to the playlist); and FLT+x 98: each specific song or artist listed separately for the background channel search (note: this field may be in the form of song/artist IDs or in text format).

Figure 18:
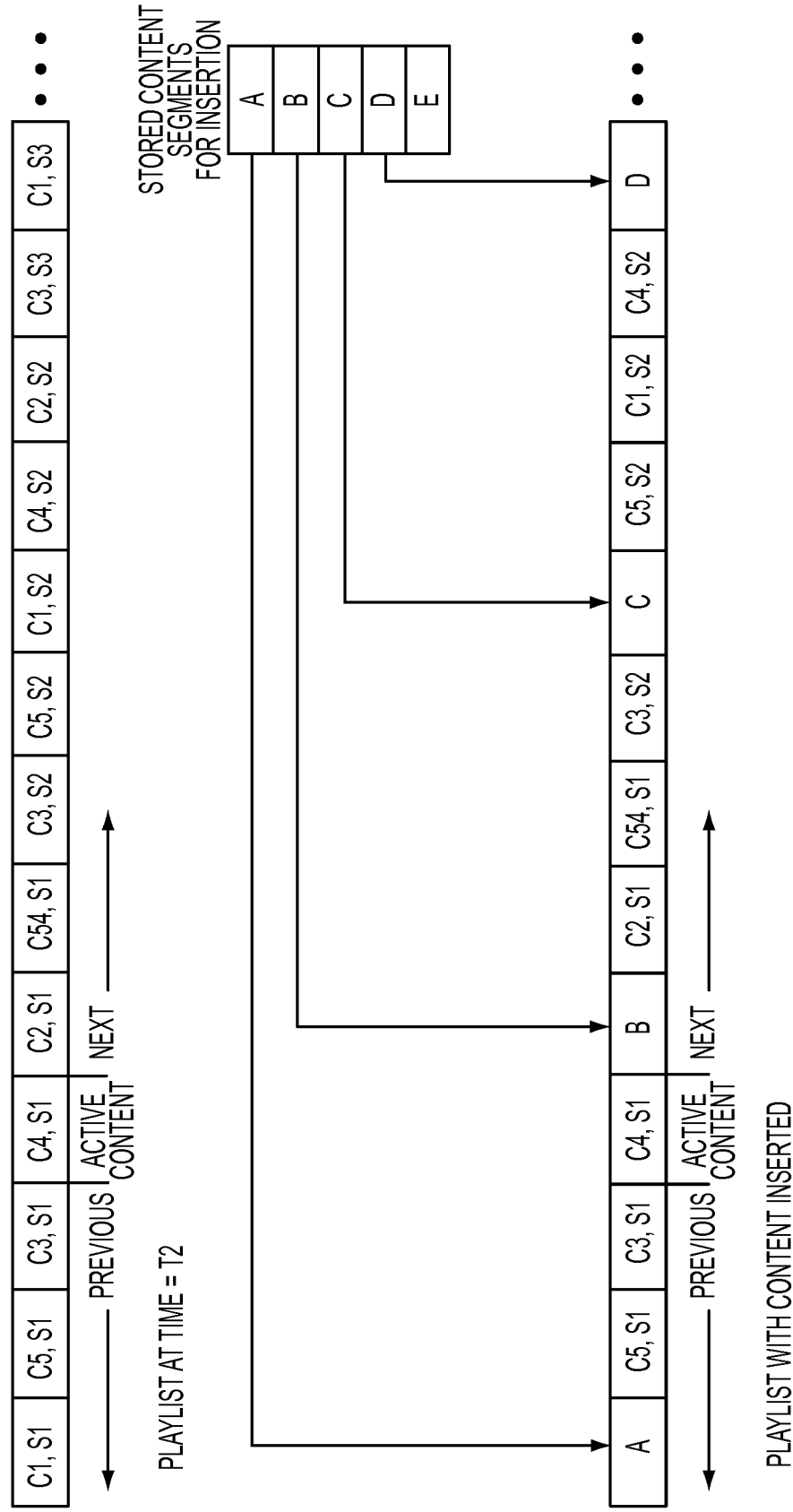
FIG. 18 illustrates personalized radio channel playlist management with content insertion in accordance with an exemplary embodiment of the present invention.

With reference to FIG. 18, in accordance with another embodiment of the present invention, the buffered playlist of a personalized radio channel can be subject to content insertion. For example, a radio receiver 14 can store content segments for insertion among the playlist segments such as commercials. The radio receiver 14 can be programmed to insert selected content insertion segments (e.g., segments A, B, C and D) at selected points among the queued playlist segments. The radio receiver 14 can be programmed to only play the full-length version of the inserted content segment as opposed to the truncated preview version. The radio receiver 14 can also be controlled to limit a user's ability to skip inserted content segments. Such control could be used to limit the ability to skip certain content segments, such as commercials, or to limit the number of skips allowed over a preset period of time.

Mix Channel Operation

Overview

In accordance with illustrative embodiments of the present invention, selected multiple channels can be buffered and automatically and alternately switched to in a designated channel order to play back a track or segment before automatically switching to another one of the selected channels, thereby generating a mix channel using minimal or no user involvement. In other words, a mix channel is created to play selected segments from the selected multiple channels in a designated order automatically without reference to any user preferences or personalization (e.g., no user input of favorite artists and/or songs) such that the user has no control over which buffered segments or tracks are played from which of the received selected multiple channels other than navigation commands such as Pause, Reverse, and Forward. Such mix channel generation shall hereinafter be referred to as "Mix Channel" operation, and the selected multiple channels whose content is blended in the Mix Channel shall hereinafter be referred to as "constituent channels" of that corresponding Mix Channel.

For example, a radio receiver 14 can be programmed to play an entire segment or track from each of the selected multiple channels on a round-robin or other predetermined basis regardless of user preferences for particular content that may be on those channels. Such an illustrative implementation simplifies the user interface. For example, buttons 32 and 34 on the user interface 22 depicted in FIG. 6 can be eliminated, as well as preview functions and displays such as screen 23 in FIG. 8. In other words, a user is exposed to spontaneous, diverse, curated content mixed from different selected buffered channels and without needing to know what is currently in buffer(s) (e.g., in the RAM 76) unlike in a preview mode. User can simply skip playback of a segment selected that has been automatically selected for playback by Mix Channel operation, and another segment from that buffered channel, or from other one of the selected buffered channels used to generate the Mix Channel, is played back. The segments are played in full unless the user elects to navigate away from that track or segment (e.g., using fast forward or reverse buttons provided on most radio receiver devices).

Eliminating preview screens or lists of available buffered content from selected channels reduces distraction and automates the user experience for a more spontaneous listening experience not unlike a traditional broadcast listening experience whereby a user is surprised by delivery of curated content that was not specifically requested by that user. The user has the advantages of being exposed to more content on different channels, but with minimal user involvement and with a simple user interface and simplified receiver operations.

In a typical use of a radio receiver 14 capable of receiving multiple channels, a user may assign favorite channels to a set of Preset buttons, so that a particular favorite channel can be quickly selected for live play (i.e., real-time playback of a channel as it is being received) by simply selecting a Preset button on the radio receiver that was previously assigned to that favorite channel. In accordance with an illustrative embodiment of the present invention, a radio receiver or other user device 14 is configured to assign a Mix Channel to a Preset button. Thus, when a user selects that Preset button, the radio receiver automatically mixes content from all of the constituent channels by automatically switching to the constituent channels in a designated order to playback a track or segment therefrom before switching to the next constituent channel.

The assignment of a Mix Channel to a button or other input control device (e.g., soft button on a display) on a radio receiver 14 can be implemented via programmed control and/or control data in a signal transmitted to the radio receiver. The Preset button settings can be default settings selected by a radio manufacturer or content provider or other party. Alternatively, a user can have the options of entering Preset button settings or otherwise designating favorite channel information (e.g., via the user interface 22 on the radio receiver 14 or via a personal computer 46 connected to the radio receiver 14). It is to be understood that the Mix Channel operation need not be limited to Preset channels corresponding to manual buttons or dedicated tuning or channel selection buttons on a radio receiver or other user device, but rather can also be soft buttons generated on a graphical user interface of the radio receiver. Further, the buffered constituent channels for the Mix Channel operation of the present invention need not be limited to Preset or favorite channels but can also be any selected group of channels that are relevant to the user in some manner. Channels related to the user or to each other in some manner can be automatically selected by the device (e.g., based on a default setting) or entered with user action or control.

Mix Channel User Interface Operations

Figure 19:
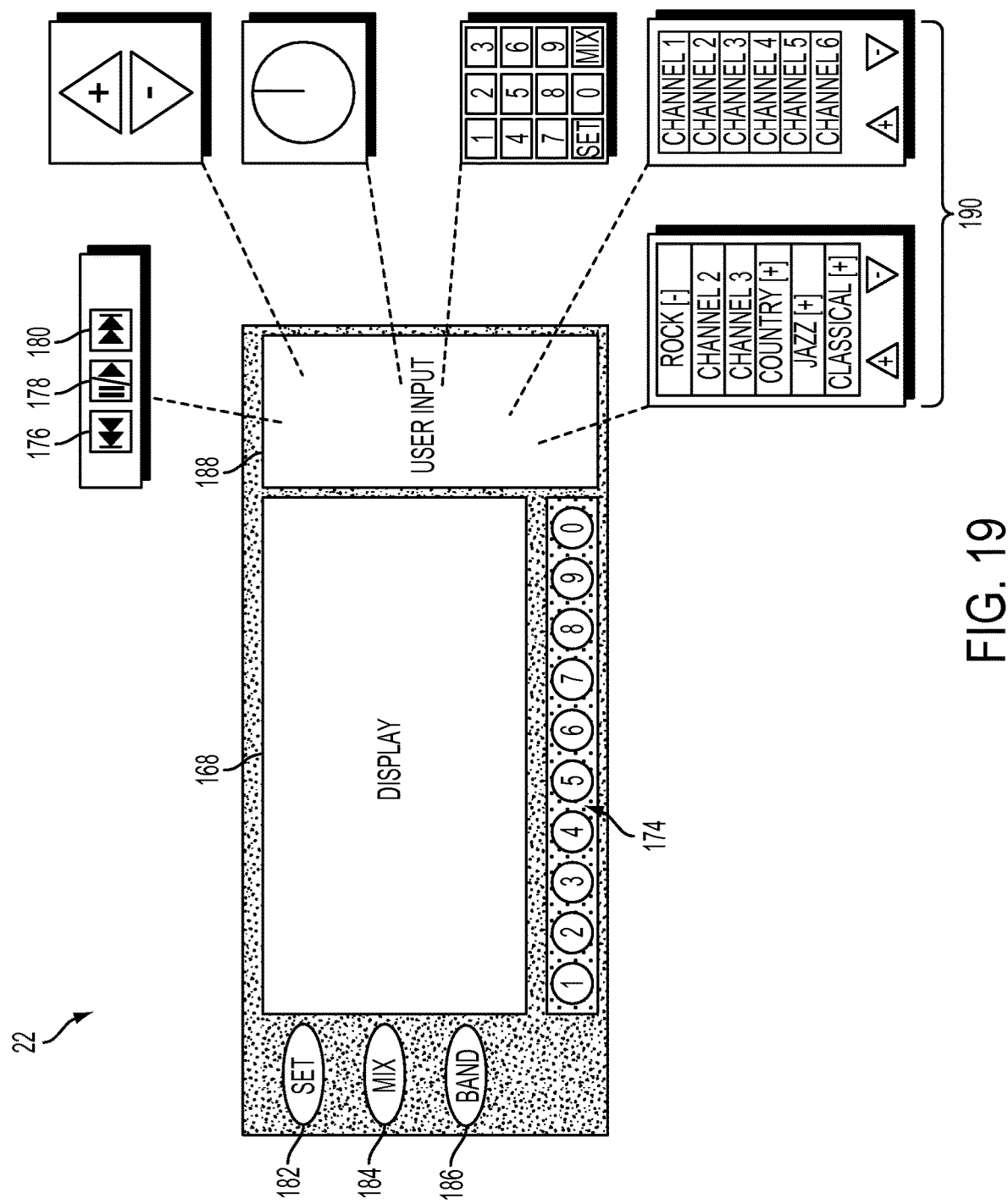
FIG. 19 illustrates a radio receiver control interface with preset buttons and other control buttons in accordance with an exemplary embodiment of the present invention.

FIG. 19 is an example of a user interface 22 for a radio receiver or other user device 14 that allows the user to select a channel for listening. In this specific example, the user can view the channel number and name of the current channel in a display area 168, as well as the title of track currently playing. The user may also select one of several Preset buttons 174 (e.g., Preset 1, Preset 2, Preset 3, . . . Preset 9, and Preset 0) to tune to a different channel, which had previously been assigned to the Preset button by the user. Alternatively, the buttons 174 correspond to other channels related to the user such as user favorites (e.g., most frequently selected by user based on receiver data, or grouped accordingly to favorite genre, and so on). The interface 22 can also provide a Reverse button 176, a Pause/Play button 178, a Forward button 180 for navigating content during playback.

In addition to a set of Preset buttons (physical or virtual) 174 (e.g., typically 5, 6, or 10 Preset buttons), the control interface 22 for the radio receiver 14 can optionally have a dedicated SET button 182 which may be used to set the Preset buttons (i.e., associate them with a selected channel for fast tuning purposes). An optional dedicated MIX button 184 can be provided that may be used to define Mix Channel Preset buttons. The control interface 22 can also be provided with an optional BAND button to switch between "groups" or "sets" of Preset buttons so that each Set has a different behavior (e.g., the same button in respective sets can be assigned to a different channels). In addition, the illustrative control interface 22 depicted in FIG. 19 has at least one method of tuning to or selecting channels directly (i.e., without using a Preset button) indicated generally at 190 such as Channel Up/Down Arrow buttons, or a Tuning Dial or knob, or a Numerical Keypad having at least 10 keys (i.e., one for each numeral from 0 to 9) and optionally additional keys, or a Touchscreen interface with a selectable list of available channels (i.e., by name or by number or both) and means to scroll through the list, or a Menu-based interface that allows for selecting channels by number, name, category, or any other means other than pre-defined Preset buttons. The keypad, the Touchscreen and the menu can also include "Set" and "Mix" buttons, as well as other special purpose keys not relating to Preset channels or Mix Channels.

This specific example of a radio user interface 22 is intended for illustrative purposes only. It is to be understood that the radio receiver 14 can show more or less information about the current channel and currently playing track; that there can be more or fewer Preset buttons; that instead of using Preset buttons to select an alternate channel, the radio receiver 14 can support a mode of listing Favorite channels previously selected by the user from which a new channel can be selected; and that the specific complement and arrangement of buttons and display elements can vary greatly from radio receiver to radio receiver. For example, the buttons can be graphical user interface buttons that represent favorite channels (e.g., that are programmed automatically and dynamically to reflect the user's taste over time based on radio receiver operations to select channels/tracks for listening), that are changeable over time, and that are surfed via any one or combination of toggle buttons, dials, up/down buttons provided on the radio receiver 14.

In accordance with an illustrative embodiment of the present invention, a user can define a Mix Channel using Preset buttons 174 (e.g., with or without on-screen prompts on the display 168) and a combination of pressing and holding a selected Preset button, and tuning to different channels or audio sources, to associate a specific collection of audio sources with a Preset button. Existing preset button functionality allows users to select a single channel and associate it with a physical (or virtual) preset button to enable easy access to content on that channel. In general a brief press of the preset button will cause the receiver to tune to the channel associated with that preset button, while a long press of the button ("press and hold") will replace the current preset with whatever channel is currently playing. In some cases after making a long press, the user will be given an option to "replace" or "cancel". In accordance with an embodiment of the present invention, the functionality of preset buttons is enhanced by providing a third option: "Add". By adding a second channel to an existing preset, the user can create a mixed channel or blended channel that alternates playback of content from two or more selected channels.

Figure 20:
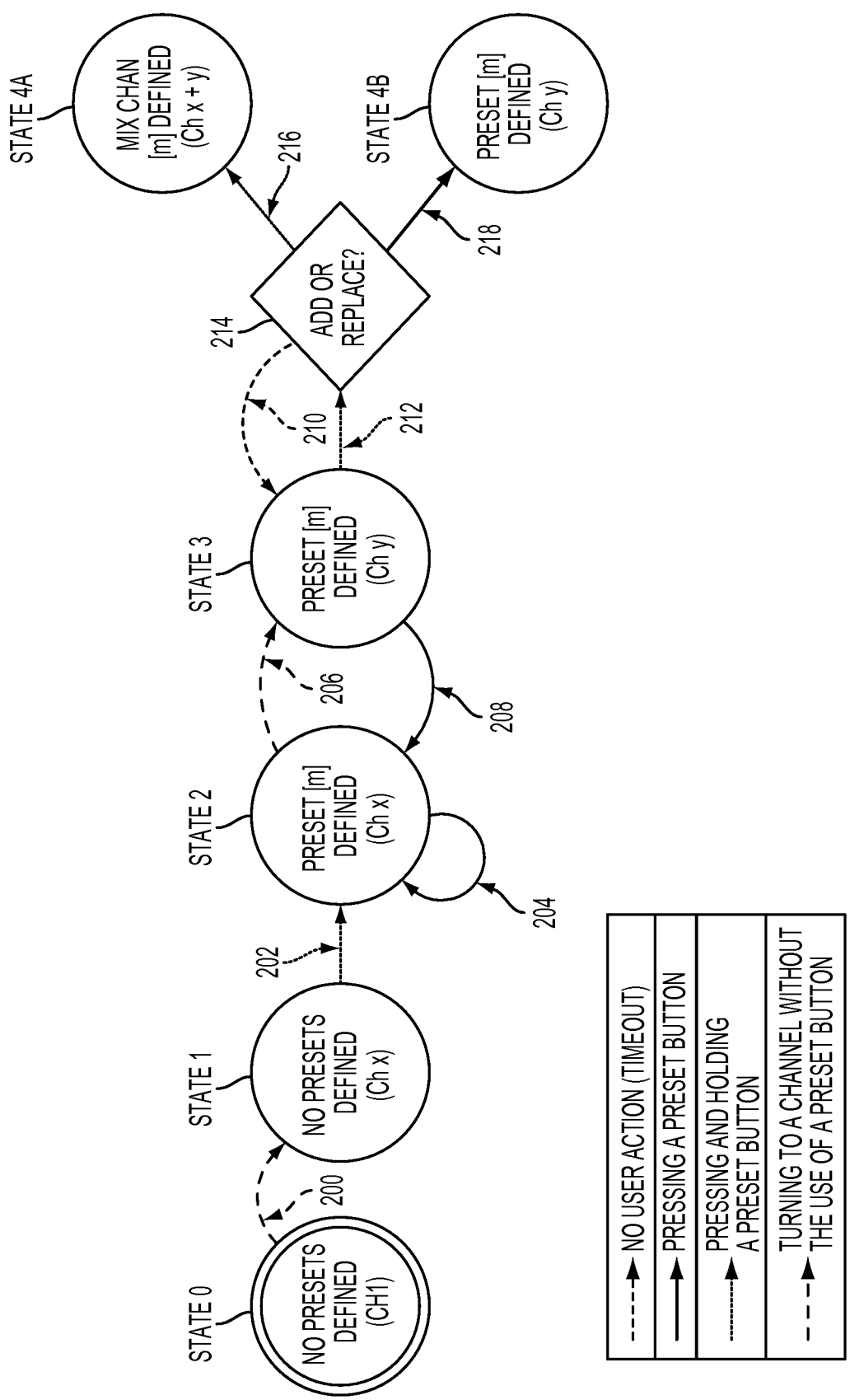
FIGS. 20 and 21 illustrate user interactions with respective radio receiver control interfaces to designate a preset button for a Mixed Channel in accordance with exemplary embodiments of the present invention.

For example, FIG. 20 illustrates an example of user interactions employing only Preset and tuning buttons to define a Mix Channel. In State 0, a radio receiver 14 is tuned to a default channel (e.g., last tuned channel before power down) or no channel (at power up, a preview channel "0" or "1" with initial screen showing radio identifier). At 200, the user tunes to a non-default channel using any one of several possible tuning methods (e.g., tuning controls 190) that do not involve the use of the Preset button(s) 174. In State 1, the radio receiver is tuned to "non-default channel" (Channel "x" where "x" is a channel number for a program channel). At 202, the user then presses and holds one of the n available Preset buttons 174. In State 2, the Preset button m is now assigned to Channel x, and radio receiver is tuned to Channel x such that pressing Preset button m again does nothing as indicated at 204. The user can then tune to a different channel (e.g. Channel y) at 206 using any one of several possible tuning methods (e.g., tuning controls 190) that do not involve the use of the Preset button(s) such that, in State 3, Preset button m is assigned to Channel x but the radio receiver is tuned to Channel y. Thus, if the user in State 3 presses Preset button m, the radio receiver tunes back to Channel x as indicated at 208. If, however, the user presses and holds Preset button m as indicated at 212, the display 168 can show a message such as "Press to replace/press and hold to add channel to MIX" as indicated at 214. If the user takes no action within a selected timeout period, as indicated at 210, that radio receiver remains in State 3 (i.e., tuned to Channel y while the Preset button m is associated with Channel x). If the user presses and holds Preset button m as indicated at 216, then the radio receiver is in State 4a whereby Preset button m is defined as a Mix of Channels x and y. If, however, the user only presses Preset button m at 218, then the radio receiver is in State 4b whereby the Preset button m is assigned to Channel y, and the radio receiver remains tuned to Channel y.

Figure 21:
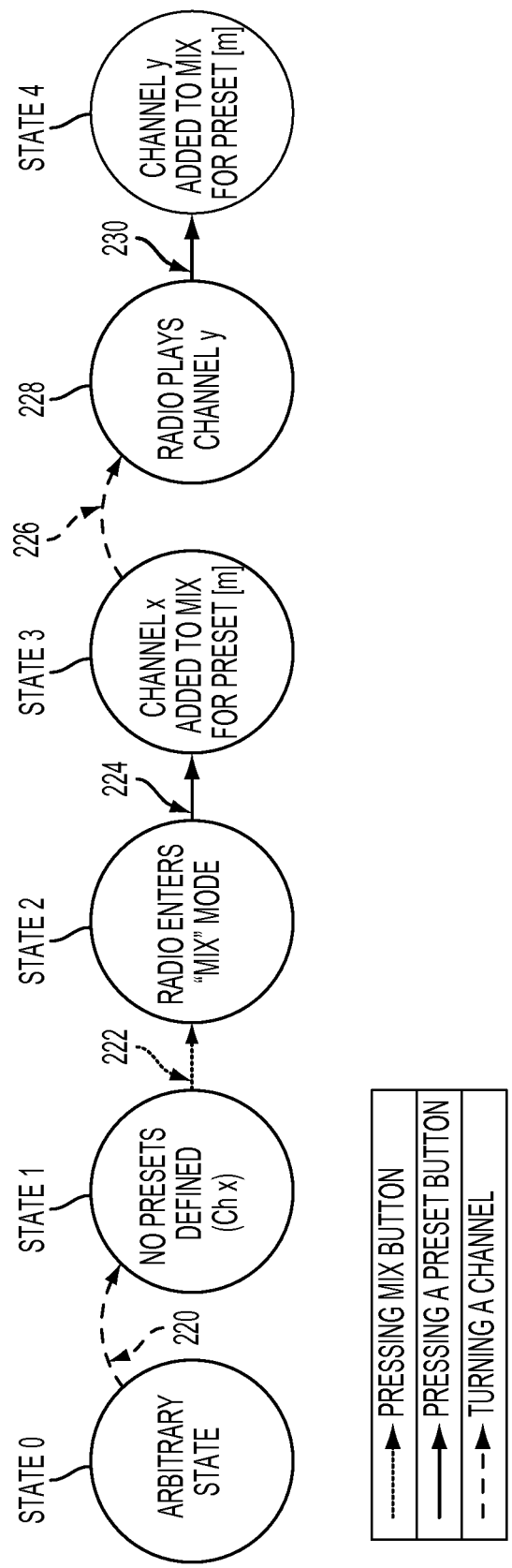

FIG. 21 illustrates an example of user interactions employing a dedicated Mix button 184 to define a Mix Channel or add two additional channels to a previously defined Preset button, or previously defined Mix Channel. In State 0, the radio receiver is tuned to any arbitrary channel or to no channel. At 220, the user tunes to a desired channel using any means available on the radio receiver (e.g., a tuning controls 190, or activation of a previously defined Preset button). In State 1, the radio receiver is tuned to a "non-default channel" (Channel "x"). At 222, when a user presses a dedicated Mix button 184, the radio receiver enters a State 2 or Mix mode whereby the radio receiver display 168 prompts the user to "press Preset button." At 224, the user presses Preset button m, and radio receiver adds Channel x to Preset button m. In State 3, a first channel is added to Mix Channel m. The radio receiver display 168 prompts the user to "Tune to next channel and press Preset. Press Mix to exit". At 226, the user tunes to a different channel using any means available (e.g., a tuning controls 190, or activation of a previously defined Preset button) such that the radio receiver plays a Channel y as indicated at 228. At 230, the user presses Preset button m, and the radio receiver is programmed to respond by adding Channel y to Preset button m in a State 4. In State 4, the radio receiver display 168 prompts the user to "Tune to next channel and press Preset. Press Mix to exit." In either example (e.g., FIG. 20 or 21), pressing and holding a Preset button while tuned to channel 1 (e.g., a default channel) resets the Preset button to an initial state, clearing any previous Preset or Mix Channel setting.

Figure 22:
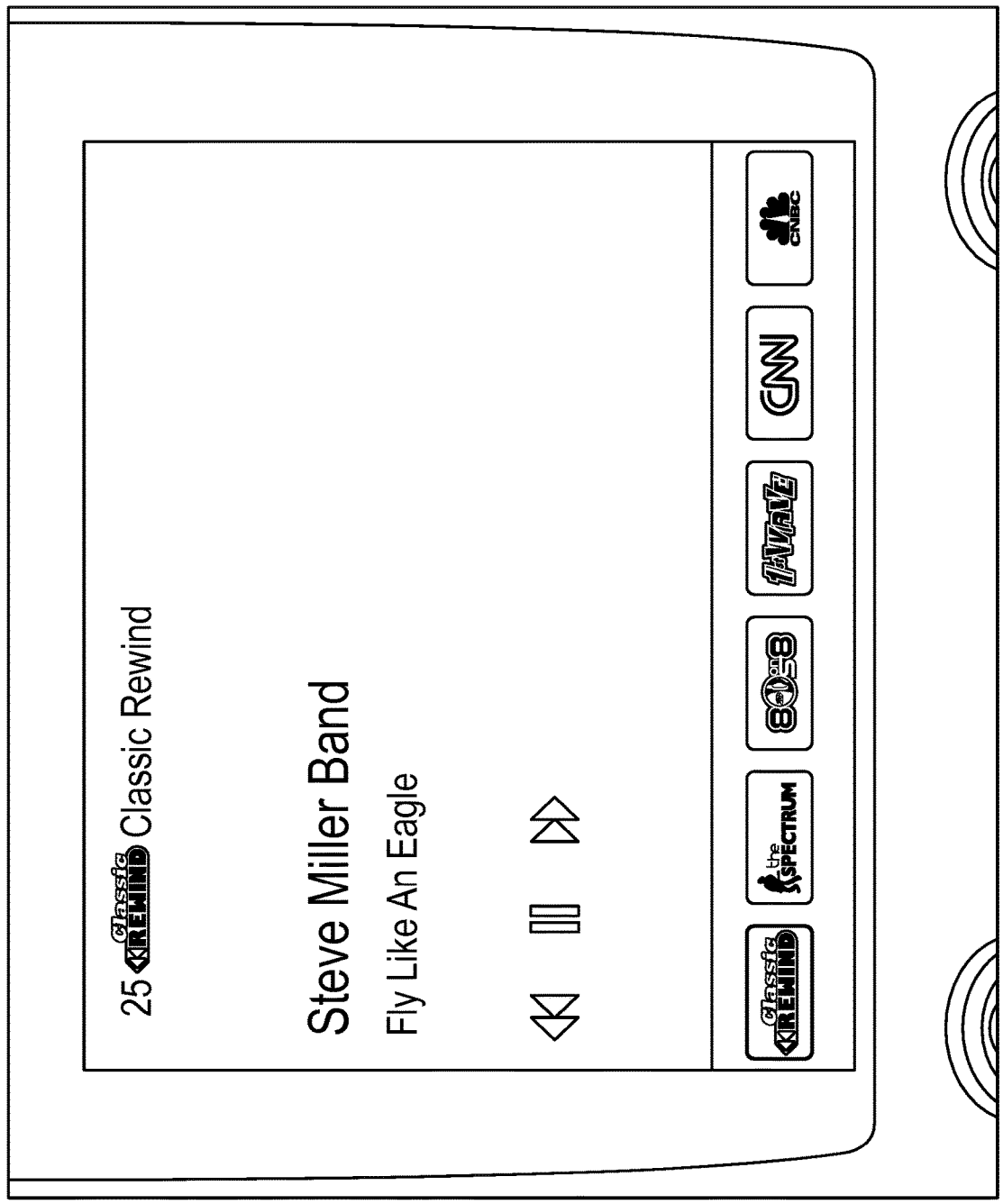
FIGS. 22, 23, 24 and 25 illustrate respective radio receiver control interfaces during Mix Channel configuration in accordance with an exemplary embodiment of the present invention.
Figure 23:
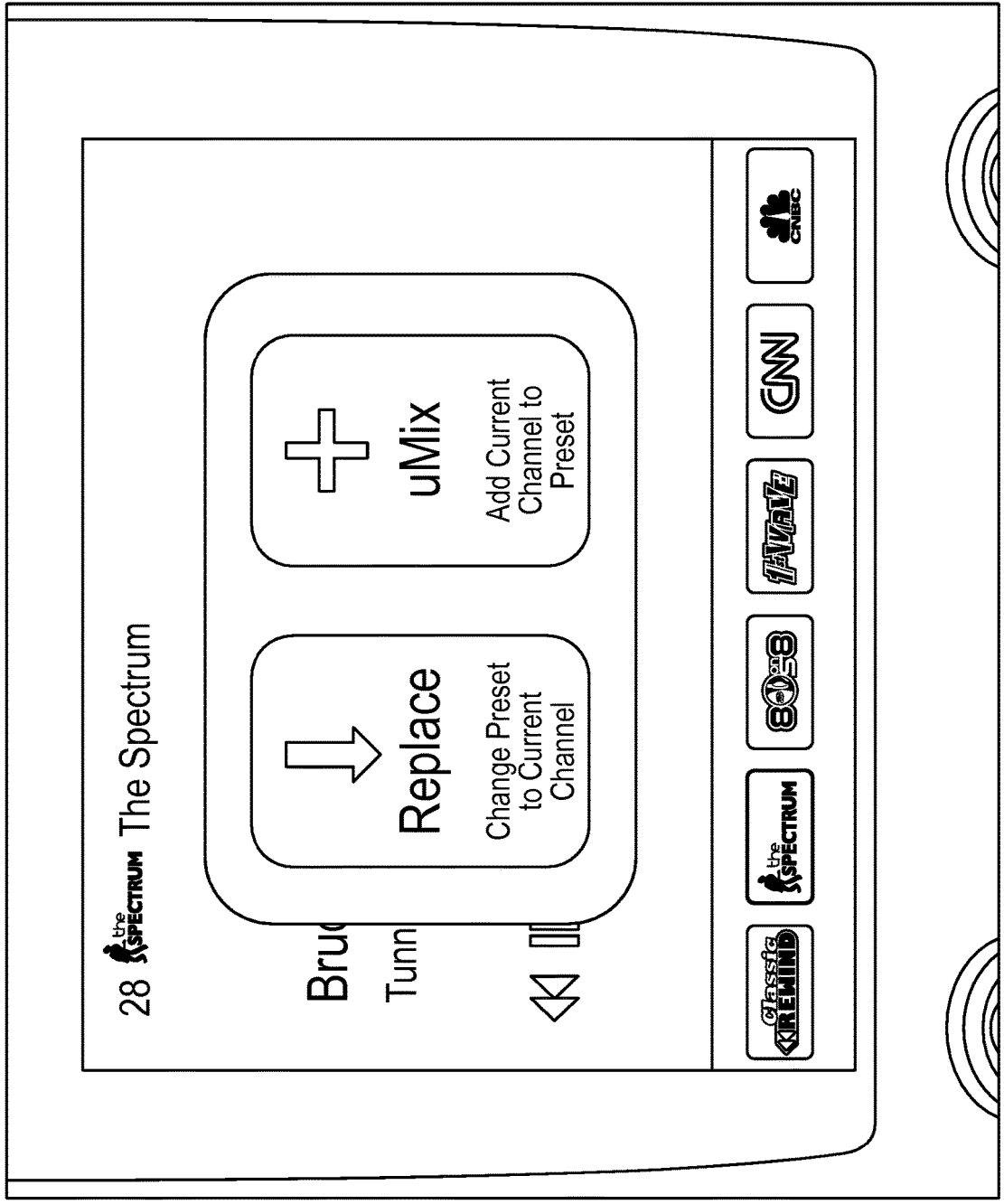
Figure 24:
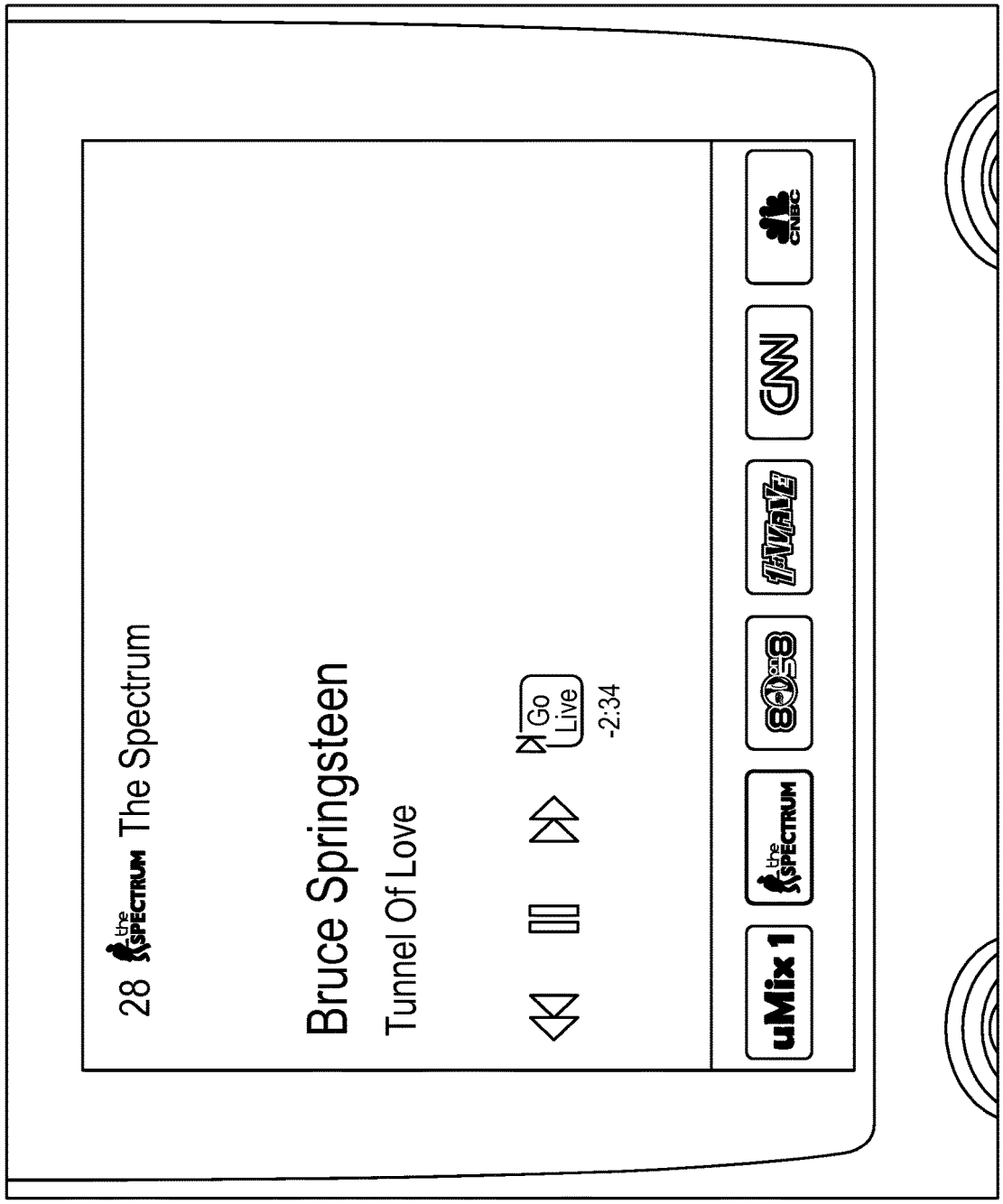
Figure 25:
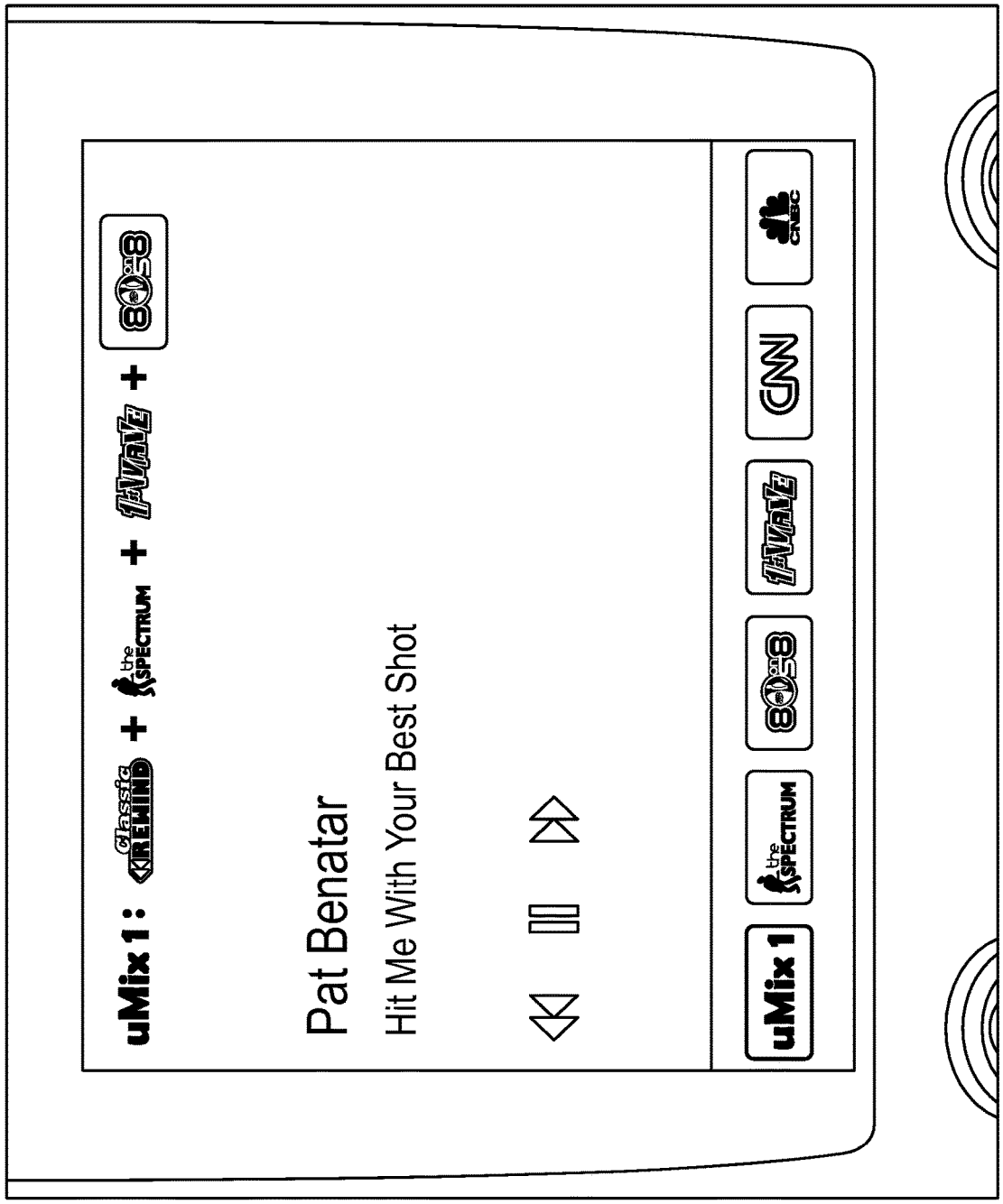

FIGS. 22, 23, 24 and 25 illustrate example screen displays with programmed soft keys or touchscreen controls for changing a Preset button to a Mix Channel button. In FIG. 22, a screen is generated on the display 168 of a radio receiver or user device 14 which shows six Preset buttons. The first four Preset buttons from the left are already assigned to selected music program channels (i.e., Classic Rewind, the Spectrum, 80s on 8, and $1^{st}$ Wave, as indicated by the respective channel logos provided for each of the soft buttons used for the Preset buttons 174). In this illustrated example, these four program music program channels will be assigned to a single Preset button (e.g., the first Preset button on the left of the screen) as constituents of a Mix Channel. As indicated in FIG. 22, the first Preset button is already assigned to the Classic Rewind channel. As explained in connection with FIG. 21, a user can select the next Preset button or otherwise use a tuning control 190 to tune the radio receiver 14 to the Spectrum channel. When the first Preset button previously assigned to the Classic Rewind channel is pressed and held, the radio receiver generates a screen prompt as shown in FIG. 23, asking the user to indicate whether (1) the first Preset button assignment to Classic Rewind should be replaced by re-assignment to the Spectrum channel; or (2) the first Preset button should be defined as a Mix Channel by adding the Spectrum channel to the channel assignment of the Preset button along with the Classic Rewind channel. As shown in FIG. 24, the radio receiver 14 can be programmed to replace the logo on the first Preset button from "Classic Rewind" to "uMix." The process described in connection with FIGS. 22-24 is repeated until all four desired channels are assigned to the first Preset button. As shown in FIG. 25, the screen on the display 168 can include the logos of each constituent of the Mix Channel (e.g., uMix 1: Classic Rewind+the Spectrum+ 80s on 8+$1^{st}$ Wave) to remind the user of those buffered channels from which content will be selected for playback when the "uMix 1" button is selected. Further, the currently playing constituent channel can be highlighted. The screen in FIG. 25 also indicates soft buttons for Reverse, Pause/ Play and Forward.

With further reference to FIGS. 11 and 23, the radio receiver or user device 14 can be programmed to generate User Interface displays to allow one or more of the following features with respect to a Mix Channel: deleting a constituent channel from a Mix Channel, replacing one of the constituent channels in a Mix Channel with a different channel, replacing a Mix Channel Preset button assignment with a conventional one-channel Preset button assignment, and replacing a conventional one-channel Preset button assignment with a Mix Channel Preset button assignment.

While some existing radio receivers may have multiple "banks" of Presets buttons that reuse the same Preset button for more than one channel in respective banks, this existing technique of assigning more than one channel to a single Preset button does not allow for the automatic switching between those channels. In other words, a user must manually select a different bank. Further, content from only one program channel is played by the radio receiver in response to selection of a Preset button.

By contrast, and in accordance with an embodiment of the present invention, one or more Preset buttons and even a separate bank of Preset buttons can be provided whereby each Preset button is associated with a Mix Channel (i.e., plural constituent channels). Thus, a radio receiver with a Band button can be configured to allow a user to scroll through plural banks of Presets and to have, for example, on a 10-Preset button device, two banks 1-10 and 11-20 that are user-defined and associated with individual program channels and a $3^{rd}$ bank 21-30 for Mix Channels assigned to each of the Preset buttons. The ability to associate a Mix Channel with only one Preset button represents an advantage over conventional use of single channel Preset buttons since the user is exposed to content on more channels but without any user interface changes. This is beneficial to Original Equipment Manufacturers such as car manufacturers since their head units do not require change to accommodate a new feature in a radio receiver such as Mix Channel operation.

In addition to a BAND button, some radio receivers have a CAT button (not shown) to facilitate navigation of multiplexed program channels in a content stream by allowing the user to see all channels within a given category or genre. That is, all rock or classical or news channel offerings or channels of other categories can be displayed in an alternating manner and scrolled through (e.g., using tuning or track selection buttons) for ease of tuning. A category can be added for Mix Channels to enable a user to see all Mix Channels (e.g., default Mix Channels and/or user-created Mix Channels). Further, radio receivers 14 can be programmed to generate lists or display logos on the display 168 to indicate user-assigned channels. In addition, a radio receiver can be provided with a Mix button 184 and corresponding screen display (e.g., area at bottom of display 168 and adjacent Preset buttons or a pop-up display on the display screen 168) of channel numbers or icons associated with a list of channels for a Mix Channel. The constituent channels and/or the Mix Channel can be represented by graphic logo(s) or some sort of Mix Channel name(s) (e.g., "Blues/Jazz" or "Rock+Comedy" channel name and optional logo and/or logos/names of constituent channels).

In accordance with an illustrative embodiment of the present invention, the radio receiver 14 can be configured to have a menu-driven user interface to define a Mix Channel generated using at least two distinct sources of audio content such as stored music, SDARS channels, FM channels, AM channels, and so on. The user is prompted to select the sources of content and then assign the mix to a specified Preset button of the user's choice. Alternatively, broadcaster or content provider can define a Mix Channel (i.e., instead of or in addition to user-defined Mix Channels) by transmitting a "suggested mix" definition over the air or other transmission means. The radio receiver, in turn, can present a pre-defined Mix Channel to the user as a virtual channel within the channel line-up of other (non-mix) channels, for example. The broadcaster-defined Mix Channels can be grouped into a separate category of channels (e.g., Mix Channels) for display and channel navigation and selection. Alternatively, the broadcaster-defined Mix Channels can be displayed among existing channels (e.g. a "Rock mix channel" would appear with the other rock channels in a genre or category-specific listing, and a Pop Mix Channel would appear in the Pop category). Such display models are provided to radio receivers via in-band or out-of-band messaging from the broadcaster. Further, broadcaster-defined Mix Channels can appear in displays of channels for corresponding different genres or categories, while user-defined Mix Channels can be displayed in a separate mix category. Alternatively, broadcaster-defined Mix Channels and user-defined Mix Channels can be displayed in the same mix category.

Different methods can be used to notify users of broadcaster or content provider-recommended sets of channels for Mix Channel operation. For example, as described below, a broadcaster-defined Mix Channel can be an extension of Featured Favorites, that is, a bank of channels can be defined and updates sent. Default blends can be created. Updates can be transmitted to radio receivers via a message. Thus, a user can pick one or more recommended Mix Channels based on Mix Channel descriptions provided in some type of extended channel description service. Alternatively, a BIC message can be sent which has fields to define Mix Channels (e.g., Mix Channel name and label block to assist radio receivers in displaying the Mix Channel), as well as fields to identify the constituent channels. A BIC message or other type of transmitted message to define Mix Channels is valuable to users having difficulty understanding the user interface on their radio receivers. With a BIC message or other messaging or data service (e.g., similar to Channel Description Service), broadcaster-defined Mix Channels are displayed on a channel list like other channels with numbers and names assigned to them (i.e., for radio receivers that are configured to know how to parse this type of message).

The user interface and programming control of the radio receiver or user device 14 can provide users with the ability to select hundreds of different combinations of constituent channels to create Mix Channels, and such content blending provides significant content personalization opportunities. Further, each of the Preset buttons can be configured for normal Preset function (e.g., associated with one channel) or Mix channel function (e.g., associated with plural constituent channels). As exemplified above in FIGS. 20 through 26, a Preset button that is assigned to a single channel can be changed into a Preset button assigned to a Mix Channel by having additional channels added to it. Conversely, a Preset button assigned to a Mix Channel can be changed into a Preset button assigned to a single channel. Further, the radio receiver or user device 14 can be configured to present separate banks of Preset buttons to the user such that at least one bank of Preset buttons is dedicated to conventional Preset functions (i.e., single channel assignment) and at least one bank of Preset buttons is dedicated to Mix Channels only. If a dedicated Mix button 184 is provided, playing back a Mix Channel can be as simple as pushing a dedicated Mix button 184 before selecting a Preset button, such that each Preset button can act as a normal Preset button (i.e., single channel assignment), or as a Mix Preset button. Radio receivers can be configured to assign unused channel numbers (e.g. channel numbers over 1000) to user-defined Mix Channels to enable a user to directly tune to these channels as though they were the program channels offered in the content provider channel line-up.

Multiple methods can be used to provide the user with control over content play while listening to a Mix Channel in accordance with illustrative embodiments of the present invention. In an illustrative implementation, the radio receiver 14 includes controls (e.g., the exemplary Reverse and Forward Buttons 176 and 180 illustrated in FIG. 19) that allow the user to navigate among tracks cached for Mix Channel generation in a reverse and forward direction, respectively. Thus, simply pressing a "Skip" button (e.g., Reverse or Forward button) causes the radio receiver or user device 14 to advance forward or backward to the next or previous constituent channel and play a selected cached track therein from the beginning of the track. For example, if the Forward button is activated, the radio receiver or user device 14 can be programmed to play the next song (e.g., the oldest, un-played song in the buffer) in the next channel that the radio receiver selects among the constituent channels in accordance with the designated order. The next or previous cached tracks are played from the start to improve the listening experience when channel changing, as described in International PCT application no. PCT/US2012/25091 in connection with Tune Start™.

Mix Channel operation provides automated switching between program channels of one or more program sources based on a designated constituent channel order and time of arrival segments in buffered channels. The automated channel switching, and selection of content for playback from the currently selected constituent channel, is independent of user tuning action or input of user preferences apart from skip operations and resetting of Preset button configurations. The Mix Channel operation therefore provides a user with automatic access and increased exposure to curated content on more channels than conventional Preset button use and manual channel surfing, thereby making the process of finding a song or other content of interest easier for the user. Mix Channel operation also minimizes distraction when listening to a Mix Channel on a mobile unit, for example. For OEM implementations with a Forward or Reverse button on the steering wheel, Mix Channel interaction with the content is possible with even less distraction than having to manipulate a tuning control 190 or other user interface control on the radio receiver or user device in or near the vehicle dashboard or console. Since multiple channels are accessed from a single Preset button when configured as a Mix Channel, more channels are accessible per bank. In addition to enhancing listener experience of diverse, curated stream of content with minimal user involvement, Mix Channel operation requires minimal user training to operate the user interface to achieve Mix Channel use.

Mix Channel Buffering

In accordance with illustrative embodiments of the present invention, a radio receiver 14 can comprise a memory or at least part of a memory to implement a multi-channel buffer (hereinafter generally referred to as "content buffer" 112) that is managed to buffer the selected received (and, in some content transmission systems, demultiplexed) constituent channels associated with a Mix Channel configuration corresponding to a currently selected Preset button. For example, the radio receiver 14 can be provided with a memory or a part of a memory that is managed by firmware to support storing content from multiple channels that have been broadcast, streamed or otherwise transmitted for buffering at least the selected received (and, as needed, demultiplexed) Mix Channel constituents, and optionally other channels such as the Smart Favorite™ channels of the currently active Tune Start™ channel configuration. A Smart Favorite™ channel is a channel designated for maintenance by a user device in a Background Instant Replay (IR) Buffer. Reference is made to commonly owned U.S. Pat. No. 7,809,326 and U.S. Patent Application Publication No. 2009/0320075, the entire contents of which are hereby incorporated herein by reference, for storage of received broadcast or streamed content at a user device 14.

The radio receiver 14 can be configured to only have a LIVE mode whereby content is stored, for example, only to volatile memory for play back substantially as it is being received. Exemplary embodiments of the different implementations of memory in the instant invention can include two modes: LIVE mode and MY RADIO mode. In the LIVE mode, the user is listening to one of the plurality of channels of the broadcast content stream in real-time or essentially as it is being received. The receiver 14 buffers at least the content from the channel to which the receiver is currently tuned. As described herein, the radio receiver 14 also buffers content from selected plural channels (i.e., Mix Channel constituents) to implement a Mix Channel operation in accordance with the present invention. In MY RADIO mode, a user is listening to content from the broadcast stream that was previously received and stored in nonvolatile memory, and the user's radio receiver is no longer in the LIVE mode. For example, a user may select MY RADIO mode when the radio receiver is incapable of receiving the broadcast stream (e.g., due to signal loss) or wishes to hear content that the user has selected for playback and is not available when the user's radio receiver is in LIVE mode.

An illustrative method for implementing the Mix Channel operation involves buffering the content received from multiple channels that have been pre-selected by or for the user, so that tracks from at least each buffered channel constituent of the Mix Channel are available for selective time-shifted playback while in LIVE mode. The radio receiver 14 maintains a buffer (e.g., content buffer 112 described above), implemented with RAM (e.g., RAM 76 in FIG. 5), HDD, flash or other storage media, in which content from the buffered channels is continuously cached using a modified FIFO (first in first out) method, for example, during reception. While the buffered content can be maintained in volatile memory and therefore erased upon powering down the radio receiver or user device 14, the multiple-channel buffer can be saved in persistent memory so that content is available instantly as soon as the radio receiver is powered up.

The content buffer 112 is sized sufficiently such that at least one full track (subject to some maximum track duration) from each buffered channel is maintained in the content buffer. The number of buffered channels can be any number depending on the memory and processing constraints of the user device and the amount of memory allocated per channel. As stated above, the radio receiver 14 is capable of playing content either live (i.e., as the content is received), or from content previously cached in the content buffer (e.g., for time-shifted playback such as at the beginning of a cached but un-played track or in response to a navigation input such as a skip operation) during live reception (i.e., Mix Channel and Tune Start™ operations but not playback in MYRADIO mode).

When the user skips a track while listening to a Mix Channel during the LIVE mode, playback begins from the start of a track previously cached in the content buffer 112 for the corresponding Mix Channel constituent. Thus, the user hears content from the constituent channel from the start of a track. As the user continues to listen to the Mix Channel, he effectively is listening to channel content that is time-shifted. In other words, the Mix Channel constituent content is delayed from the real-time content reception by, for example, a duration equal to the time the channel content was selected for playback in the Mix Channel minus the time the cached track started broadcasting or transmitting.

In accordance with an illustrative embodiment of the present invention, the content buffer 112 comprises a Background Instant Replay (BIR) buffer and Foreground Instant Replay (FIR) buffer. The BIR is used to buffer content of some or all of received program channels (e.g., at least content from the constituent channels of a Mix Channel configuration and optionally Smart Favorite™ channel content as disclosed in the afore-mentioned International PCT application no. PCT/US2012/25091). The FIR is used to buffer the currently selected channel for listening in the LIVE mode. More specifically, in accordance with the Instant Replay (IR) operation, a radio receiver or other user device buffers the audio content of the currently tuned channel in the FIR buffer (e.g., a FIFO RAM buffer) so that the audio of the channel can be paused/resumed, skipped by track forward and backward, and rewound and fast-forwarded. IR navigation capabilities can be restricted on a channel basis, through configuration data provided in a broadcast data service. For example, for music channels, the number of rewind and forward skips can optionally be limited to 1 and 5, respectively, for each channel per hour. In one illustrative embodiment, the FIR buffer is the main IR buffer used for the channel currently tuned by the user and is to be distinguished from the BIR buffers used to accumulate content for un-tuned Mix Channel constituents or Smart Favorite™ channels.

As stated above, the Instant Replay operation allows the user, while listening to a live broadcast, to control content that they have already listened to in the LIVE mode. Thus, the user is able to pause, rewind, and fast forward back to the real-time broadcast. The user can also skip through tracks stored in the volatile memory based on the track or segment boundary information (e.g., PAD) stored along with the content. This allows the user, while listening to live broadcast or streamed content, to stop and replay a certain lyric or answer to a question that they may not have understood or that they had liked, without missing the rest of the song or interview. The Replay function then allows the user to continue listening to the buffered content or the user can "fast forward" to the end of the buffer to catch up with the live content. The memory used for the Replay function is preferably volatile memory, but could be implemented using any suitable memory technology.

As an example, constituent channels for Mix Channel operation each have their content constantly buffered in a FIFO RAM buffer in the content buffer that is employed as the Background Instant Replay (BM) Buffer (e.g., with a capacity of around 10 to 60 minutes for each constituent channel depending on product RAM resources and cost targets). Once a constituent channel is selected for play, the BIR Buffer content can be copied into the radio's Foreground Instant Replay (FIR) Buffer, replacing its contents and effectively seeding it with historical content for further radio and user manipulation. It is to be understood that copying need not be implemented as an actual memory copy but can instead involve pointer management and other methods.

In view of the foregoing, it is to be understood that channels (e.g., at least Mix Channel constituents) are buffered in the background even if the user is not actively listening to the Mix Channel. When a track or segment ends or the user has employed a Forward or Reverse skip operation, the next song in the multi-channel buffer is played. The song can be, but most likely is not, played back from the same channel. The radio receiver 14 generally automatically switches to the next constituent channel according to the Mix Channel configuration order for constituent channels. The number of buffered songs grows rapidly over time. For example, for each 3 songs played on 4 constituent channels in a Mix Channel, there can be approximately 10 more songs added in the content buffer that the listener can skip to if desired. After an hour, the number of new content tracks or segments (e.g., songs) queued ahead for the 4-channel Mix Channel can grow to over 60 songs, assuming typical music channel bitrates and buffer sizes in existing radio receivers. Thus, a user is provided with dozens of songs from which segments are automatically selected from each of the 4 constituent channels for play back and to skip through if desired, thereby exposing the user to more diverse content than tuning the receiver to only a single channel during a listening period. The radio receiver does not require a large local database built over time (e.g., a large local database for storage per channel). The content buffer is instead refreshed with what is broadcast. No user interaction is required to simply enjoy the mix or blend of content from the constituent channels, that is, no new radio controls, buttons or menus are required. The user can simply skip uninteresting content in the Mix Channel playlist. Playback, however, is not user-driven based on knowledge of what is forthcoming for playback (e.g., preview) or content preferences specified by the user.

As stated above, the number of channels that can be simultaneously designated as buffered channels (i.e., supported with their own BIR Buffer) to support one or more Mix Channels can vary depends on radio receiver or device 14 resources (e.g., storage capabilities) and device data/audio extraction capabilities. In a radio receiver or user device 14 with sufficient capacity for buffering and processing, all channels can be processed as a buffered Smart Favorite™ channel, or for Mix Channel operation regardless of whether the channel is part of an actively configured Mix Channel or not. In some cases, the radio receiver may not have capacity to buffer all program channels being received. Thus, when a user selects a new Preset button in a particular Preset bank that is associated with a particular Mix Channel, the constituent channels of that Mix Channel will begin fill their respective BIR Buffers.

Managing Buffer Contents

In accordance with illustrative embodiments of the present invention, each channel buffer in the multi-channel content buffer 112 is managed as a normal circular buffer in which the oldest content is dropped and replaced with the newest content. The receiver or user device 14 determines which content segments in the buffer to skip, which results in them being dropped from the content stream. The skipped segments remain in the buffer and are managed no differently than other segments.

Different methods for managing the buffered channel contents can be used, depending on the storage resources of the radio receiver or user device 14 and the different combinations of features achieved by illustrative embodiments of the present invention. For example, in one implementation, the radio receiver 14 maintains at least one full track in the content buffer 112 for each buffered channel. Each time a new track is cached for a given channel, the previous older track for that channel is deleted from the buffer to make room for additional caching.

In accordance with an alternative illustrative embodiment, the radio receiver 14 maintains more than one full track in the content buffer 112 for each buffered channel. The number of tracks cached for each channel may be fixed in number (i.e., n tracks per channel) or based on time duration (i.e., all full tracks cached within the previous m minutes). In still yet another illustrative embodiment, the radio receiver 14 maintains all content, whether complete or incomplete tracks, for a set duration per track (i.e., all content received for the channel for the previous m minutes) or a set amount of storage per track (i.e. all content received for the channel that can be stored in k bytes of content buffer memory.)

Content buffer 112 storage may be allocated to buffered channels based on a fix amount per channel (e.g., by duration or by storage), or may be dynamically allocated to buffered channels to accommodate differing track lengths currently cached (i.e., each channel allocated storage so that it can cache n channels for that channel).

The radio receiver 14 can limit the length of a cached track to a set maximum duration or size (e.g., 10 minutes or 4 MBytes) to accommodate unusually long tracks. Depending on intended behavior, such long tracks may be continuously cached in a FIFO manner so as much of the track as possible is maintained in the cache, or may be deleted (so the user is unable to play from a cached track unless it is certain it can be played from the start).

Multiple methods for storing and retrieving cached data into and out of the content buffer 112 can be used, including but not limited to continuous ring buffers, fix block allocations and linked lists, and other methods apparent to those skilled in the art.

In addition, for simplicity, selection of related channels supported by the Tune Start™ operation can be represented by a Favorites bank. The selection of Favorites channels need not be single channel Preset button designations but rather user-favored or otherwise related content. For example, a Favorites bank can consist of the Preset buttons channels, or a group of channels that are statistically selected for a user based on listening habits, or a group of channels having a similar music genre, among other related groups of channels. Some user devices 14 can support multiple user Preset banks (e.g., two or more banks, each with "n" Smart Favorite™ channels each corresponding to "n" Preset buttons on the radio receiver). Further, in an example function referred to as "Featured Favorites," Preset banks are defined and broadcast (e.g., by an SDARS provider). With Featured Favorites, a content provider such as an SDARS broadcaster, for example, can dynamically define sets of channel Preset banks from multiple categories to help the user explore new and related content, for example banks of holiday channels, artist channels, easy listening channels, and celebrity channels (e.g., "Howards favorites"), and the like. The radio receiver or user device 14 can be configured to define each channel in these banks as constituent channels of a Mix Channel, thereby alternating playback or segments or tracks from each of the channels in a Favorites bank or Featured Favorites bank. A number of options exist to alert a user to the option of listening to each channel in a Favorites bank separately or electing to blend them into a Mix Channel, such as a soft screen prompt to instruct the radio receiver to "mix" the currently selected Favorites bank or Featured Favorites bank, and display screens listing channel number, title and/or logo of the constituent channels and optionally the content forthcoming in the channels that constitute the presently selected Favorites bank.

Whenever a given conventional user Preset bank is active (i.e., the Preset buttons are each assigned to a single channel and not a Mix Channel), the channels in that bank are buffered and, by default, supported by the Tune Start™ operation and can be blended together using a Mix Channel operation. When changing to a different conventional user Preset bank, the replacement of the currently designated Smart Favorite™ channels from a previously active Favorites bank with the set of channels from a new active Favorites bank can be delayed until the new active Favorites bank has been the active bank for 5 seconds, for example. The delay (e.g., 5 seconds) avoids loss of the buffered data for situations where the user is merely viewing the list of other banks, but ultimately stays with the current bank. The delay need not be imposed on designating the channels in the active Favorites bank as Smart Favorite™ channels after power up. If the user selects a new active Favorites bank and a channel is assigned to both the previously active Favorites bank and the new bank, the contents of the BIR buffer for that channel need not be flushed as a result of selecting the new Favorites bank.

Identifying Track Boundaries

In a radio receiver or other device 14 capable of receiving broadcast or streamed content channels, each channel can be modeled as a series of tracks. "Segment" or "track" hereinafter refers to a portion of content typically corresponding to one song on a music channel, an uninterrupted segment of news reporting or talk radio content, or uninterrupted segment of a sports event broadcast, a single commercial advertisement, a segment of DJ banter or station identification between songs, among other continuous segments of content. "Uninterrupted" in this context means continuous audio content that is not interrupted by a different content type such as an advertisement, DJ banter, station identification, and so on. Since the content of the respective channels in broadcast or streamed content transmissions is programmed and then broadcast or streamed independently of other channels, the start and end of tracks on different channels are not synchronized in time. It is presumed that the radio receiver 14 has a method of identifying separate tracks or segments in a channel or program content stream through encoding incorporated within the received content, through content metadata conveyed in parallel with the content, or through metadata received via conveyance to the radio receiver separate from the content. This track identification capability is known for many broadcast and streaming services, and is discussed in more detail below.

The radio receiver or user device 14 implements a method for identifying track boundaries in the received content in accordance with illustrative embodiments of the present invention. In one illustrative embodiment, track identification implemented by some commercial satellite radio receivers is employed wherein metadata is transmitted in parallel with broadcast digitized audio content. The metadata can include, among other fields, a Program Identifier (PID) that indicates, when the device 14 has received a new PID value, that a new track has started.

In an exemplary case of a channel playing songs with DJ announcements between the songs, the PID changes value at the start of each song and at the start of each segment of DJ announcements 166, allowing the radio receiver 14 or other device to determine the start of each track for purposes of caching and playback. Other metadata such as program Labels (e.g., artist name, song title, etc.) can change; however, for the purposes of effective track identification, these changes can be ignored by the radio receiver 14. For example, labels are changed by the DJ during song without a corresponding PID change.

Other methods can be used for identifying track boundaries as appropriate for the type of content and content delivery mechanisms. The particular method used for track identification is not critical, as long as some type of method is provided.

In accordance with other illustrative embodiments of the present invention, for skip operations in a satellite and/or terrestrial mode, the radio receiver or device 14 can identify track boundaries or skip markers as either: PID changes in the broadcast metadata, or changes in Artist/Title labels in the broadcast metadata. For example, a radio receiver or device 14 can automatically select one of the methods above for each channel, based on the channel content type of the channel as follows: for music, track boundaries or track skip markers are based on PID changes in the broadcast metadata; and for content other than music, track skip markers can be based on Artist/Title label changes in the broadcast metadata. Thus, a good user experience is achieved for most channels when using the Mixed Channel or Tune Start™ operation, given that (a) PIDs are most closely managed by operations for music channels and are intended to identify "song" starts, (b) PIDs may be infrequent in non-music channels such as talk, sports, and news and therefore may not provide sufficient granularity for user IR navigation for these channels, and (c) label changes do provide reasonable granularity for user IR navigation for the non-music channels.

If the device 14 is operating in an IP mode (e.g., receiving content via streaming), track skip markers can be based on the Artist/Title label changes in the metadata transmitted in-band with the audio stream or in a separate band from the audio stream. Alternatively, the device can emulate track marker behavior of a radio receiver by using, for example, data and a parameter that identifies channel content type to behave similarly to use of PID and channel content type, respectively, as described above.

From the user's perspective, skipping over short segments such as DJ/announcement interstitials, advertisements, and the like and queuing only "real" segments (songs, news segments, sports segments, etc.) from the start when changing to a Mix Channel constituent channel or a Tune Start™ operation channel would be preferred. However, a content provider may prefer not to facilitate skips over advertisements and some announcements. Further, segments may not be consistently identified for all channels. For example, most (but not all) music channels curated by the broadcaster may mark songs by PID (i.e., Program ID) changes, and a "song" is usually distinguishable from an interstitial. However, only PAD value changes may distinguish segments for many news/talk/sports channels. For some news/talk channels, PAD values changes much more frequently than a logical "segment", e.g., cycling stock tickers during a financial news program or cycling score/game statistics during a sports broadcast. As described above, different demarcations between content segments or tracks can be used, depending on content and/or channel type, for skipping purposes in accordance with illustrative embodiments of the present invention.

Thus, the Mix Channel and Tune Start™ operations provide an optimal balance of automation and user control, which is a particularly useful functionality for products that feature a wide variety of music, talk, news, and sports content. Mix Channel and Tune Start™ operations work best for music. Boundaries for news and comedy channels are less clear but it is still possible for a radio receiver to automatically locate a buffered segment for playback in accordance with Mix Channel and/or Tune Start™ operations. Thus, a Mix Channel can consist of constituent channels selected from different categories or genres of content. For example, in addition to using a Mix Channel for music listening, the radio receiver can be configured through Mix Channel operation to automatically blend content types such as providing comedy in the mix with music. Further, a user can configure a Mix Channel to play different news segments with some music for playback during a morning commute, and configure a different Mix Channel with music and comedy for playback during an evening commute.

Determining which Constituent Channel and which Segment for Next Play

When automatically and alternately switching among constituent channels of a Mix channel, the order among the constituent channels is determined by programmed configuration of radio receiver or user device 14 (e.g., as selected by the user, or by default, or as specified by a content provider in a message transmitted via in-band or out-of-band signaling with respect to content stream). Many embodiments exist for proportioning content from selected constituent channels to create a Mix Channel experience. For a first example, content in the Mix Channel can be played back in the order of song-start time regardless of channel (e.g., switch among constituent channels as needed to play oldest song in buffer 112, next oldest song 112, next oldest song 112, and so on as determined among their respective circular buffers). In a second example, content from constituent channels A, B and C is mixed for playback on a fixed rotation or round robin basis (e.g., Song from Channel A, Song from Channel B, Song from Channel C, Song from Channel A, Song from Channel B, and so on). Alternatively, a combination of the first and second examples can be used (e.g., play oldest song in buffer for a channel, oldest song in buffer from different channel, oldest song in buffer from another different channel, and so on).

In accordance with another illustrative embodiment, the radio receiver or user device 14 can be configured to allow the same constituent channel to be played back in the Mix Channel multiple times relative to other constituent channels to change mix frequency. For example, if channel A is added to the Mix Channel playback twice for each track or segment played back from channel B, then the Mix Channel would play back 2 songs from channel A and then 1 song from channel B and then repeat that pattern. This channel order configuration can allow a user to create a channel that has, for example, two blues songs for every one classic rock song. Further, as an alternative to designated channel order configuration patterns, random or pseudo-random selection from all songs from all the constituent channels in the content buffer 112 that are not currently playing can be used.

All of these channel order configuration can be implemented in the radio receiver 14 with software only (e.g., using no new buttons but using different behavior for existing buttons) and as default settings. With a more complicated User Interface (e.g., having a menu, pop up or other display input), the user can control the channel order configuration and therefore mix of content more directly by specifying how he or she wants to mix the content from the selected constituent channels. For example, the user could select any of suggested methods for mixing such as those described above, or directly specify parameters for channel order mix ratio or provide weighting percentages for random selection. Alternatively, a default for random channel order can be equal weight to each constituent channel.

Once the next constituent channel is determined for playback based on channel order configuration of the Mix Channel, the radio receiver is configured to determine the candidate track or playback point within that constituent channel. In an accordance with an illustrative embodiment of the present invention, a radio receiver or user device 14 is programmed to employ Playback pointer(s) in the channel buffer(s) of content buffer 112 to designate the point in the buffer from which buffered content is played back to a user, which may or may not be substantially the same as the real-time broadcast and received point (i.e., "live" playback point). For example, in the cases of Mix Channel and Tune Start™ operations, the playback point in a buffered channel is likely to be the beginning of the oldest, un-played cached track or segment, as opposed to the "live" playback point. Pointers can also be employed to indicate the Last Play Point to facilitate the radio receiver determination of what buffered content has been played or un-played. The Playback pointers, Last Play Point pointers and any other pointers can be implemented as write pointers to real-time content in the content buffer 112 (e.g., where the multi-channel buffer can be implemented as respective circular buffers for respective buffered channels). The radio receiver or user device 14 can be operated to pick any playback point in simultaneous write buffers that has not been overwritten, and then to output the buffered content beginning from that point to the user. Further, the radio receiver or user device 14 can be operated to automatically change to a playback point in another buffer that has not been overwritten in accordance with the programmed operation (e.g., Mix Channel operation, or Tune Scan™ or Channel Scan operations as described in the aforementioned International PCT application no. PCT/US2012/25091). Thus, the channel buffer 112 can be configured using multiple channel buffers and pointers as opposed to storage of a multiplexed playback channel buffer wherein selected content from selected channels are queued for the purposes of playback.

In some aspects, a Mix Channel operation in a radio receiver or user device 14 can be similar to Channel Scan operations described in the above-referenced International PCT application no. PCT/US2012/25091. When Channel Scanning, activation of a "Scan" button or similar method by the user causes the radio receiver or user device 14 to cycle through a group of channels, playing a short excerpt (e.g., 5 to 20 seconds) of audio from each channel before advancing to the next channel in the group. To listen to a Mix Channel, activation of a Preset button by the user causes the radio receiver or user device 14 to cycle through a group of constituent channels, playing a track or segment (e.g., preferably in its entirety) of audio from each constituent channel before advancing to the next constituent channel in the group in accordance with a constituent channel order designated by the Mix Channel configuration (e.g., a radio receiver parameter indicating a default order or user-specified order).

Different methods can be used for selecting which candidate track to play during Mix Channel operation following a channel change corresponding to the designated channel order in which tracks from constituent channels are played back (e.g., from oldest cached track, from newest cached track, and so on). For example, in accordance with one illustrative embodiment, the Mix Channel operation can start playing the oldest un-played cached track among respective ones of the constituent channels according to their playback order, and then play the next oldest un-played cached track among all constituent channels, and so forth. In accordance with another illustrative embodiment, other cached tracks or segments from the constituent channels can be played. For purposes of determining the oldest track that has not been previously played by the user, any track with a Last Play Point within the track and all older tracks are treated as previously played by the user.

More specifically and similar to Tune Scan™, the radio receiver or user device 14 can playback Mix Channel constituent channels by playing from the start of the oldest track in the channel's BIR Buffer that, for example,
- still has the start of the track in the channel's buffer,
- had not been previously played by the user,
- is newer than the track played the previous scan pass for this channel, and
- is fully buffered in the BIR Buffer and is longer than 45 seconds duration.

If the Mix Channel operation plays from this channel multiple times while cycling through its constituent channels (i.e., during the user's listening period and before the user selects another Preset button or otherwise tunes away), it advances to the next newest track in the BIR Buffer for each cycle.

In accordance with illustrative embodiments of the present invention, for each constituent channel of a Mix Channel, the track or segment played from that constituent channel is played from the start of the track, from its buffered content, instead of from the live or real-time broadcast position. Thus, the user is able to hear tracks from their start during Mix Channel playback, making the listener experience more satisfying.

In accordance with another illustrative embodiment of the present invention, a radio receiver or user device 14 can be configured to provide Mix Channel operation based on a set of default operations that can simplify user interface interactions (e.g., while driving) but can also be reversible or editable by the user (e.g., at a later time). The user device 14 can simply indicate a reminder to the user to change default or current settings with an on-screen flag (e.g., mail icon). If the radio receiver or user device 14 reaches an extraction limit, or a point where a programmed decision tree is too large for a driver to handle, for example, then the user device can employ a selected default setting and generate a message or indicator to advise the user of default choices made by the device and the ability to later review and edit default parameters and setting (e.g., defer parameter review and editing to a later time and not while not driving). Such an implementation allows recovery of preset states, editing of mix lists if/when limits are reached. Depending on the complexity of the user interface (UI), the option to manipulate Preset button and Mix Channel and configuration parameters is readily available, and the indicator simply serves to let the user know when a default UI decision occurs and that the user may wish to confirm or change it.

In addition, when a user requests playback of a Mix Channel (e.g., selects a corresponding Preset button assigned to a desired Mix Channel configuration of constituent channels), tracks or other segments or portions of content deep in the corresponding constituent channel BIR Buffers are played from track start, thereby potentially playing multiple buffered tracks per constituent channel. This maximizes content on channels available for listening or navigating as desired (e.g., skipping, reverse selection). That is, if the user selects an advance button (e.g., Forward or Reverse buttons 180 and 176), the user device 14 can skip to a previous or next track or segment of content from a constituent channel of the Mix Channel. In any event, the user is not given control to pick content from multiple buffered channels because Mix Channel constituent channels are buffered and played back essentially as received. In other words, the user does not know what is coming up on other channels and switch to it. Mix Channel surfing is not blending of preferred content that is forthcoming and buffered, but rather simply mixing channel content as transmitted. While Mix Channel operation is not a completely personalized music service (i.e., in terms of being able to specify artists or songs that are preferred), it provides a convenient way to be exposed to content on plural selected channels with minimal user interface interaction and, for mobile devices, less distraction for mobile users (drivers, pedestrians, etc).

With respect to SDARS, Mix Channel and Tune Start™ operations are implemented primarily for music channels and comedy channels, that is, channels that have identifiable boundaries between segments and the segments are relatively short in duration. Conversely, a radio receiver 14 that attempts a playback point from within a 30 minute talk show or 10-15 minute news story is likely to no longer have the segment beginning cached and is likely to deliver a truncated segment without pretext or context to be useful to the user, thereby degrading the listening experience. For Mix Channel constituent channels, the user device 14 can play multiple tracks or segments from the constituent channels' BIR buffers to expose the user to different content without any user action other than perhaps to skip forward or backward using the navigation buttons 176 and 180. As stated above, the user device 14 can optionally be configured to restrict Mix Channel operation to music channels; however, the user device 14 can also include non-music channels (e.g., comedy channels) in a Mix Channel. As a further example, configuration data (e.g., channel content-type metadata for each received channel that is transmitted in-band or out-of-band with respect to the received signal, or stored at the receiver) can be established to determine whether each constituent channel is "music" or "not music," and thereby control whether the radio receiver or user device 14 can be configured to include or exclude a program channel as one of the constituent channels in a Mix channel based on this channel metadata.

As stated above, Multi-channel IR can be, for example, supported by the use of simultaneous buffering of multiple channels (e.g., "Smart Favorite™ channels"), along with Tune Start™ and Tune Scan™. It is to be understood that the benefits of the Multi-channel IR functionality (e.g., access to pre-buffered content when tuning a channel) are available independent of the Tune Start™ and Tune Scan™ features. In accordance with an illustrative embodiment of the present invention, when the user tunes to a Smart Favorite™ channel, the BIR (Background Instant Replay) buffer contents for that channel are effectively copied to the FIR (Foreground Instant Replay) buffer. The user can then skip backwards into the buffered contents if desired. When the user tunes away from a Smart Favorite™ channel, as much of the accumulated contents of the FIR buffer that will fit in the channel's BIR buffer can be effectively copied into the BIR buffer. The user device 14 can be configured to automatically delete IR content when a new active channel is tuned. For example, the user device 14 can be configured to not mix content from multiple channels in a single FIR for a currently tuned channel, or BIR buffer for a particular channel.

As stated above in connection with Channel Scan, there are no constraints on how the radio receiver or user device 14 selects channels for a Channel Scan operation. Examples include, but are not limited to, scan all channels in a given Category; scan all channels assigned to a user's "Favorites" list (e.g., preferred content type(s), artist(s) or channel(s)) or Smart Favorite™ channels, scan all channels assigned to the current Preset banks, scan all channels assigned to any of the user's Preset banks, scan all channels in a "scan list" that the user can specify in a user device setup menu.

As exemplified above, different policies are implemented by the radio receiver 14 when playing back content from different constituent channels (i.e., an automated channel change during Mix Channel). It is to be understood that a policy implemented by the radio receiver 14 as described herein can be a set of rules or algorithm(s) implemented in software, or indicated in metadata provided to the radio receiver, for example, for controlling radio receiver functions such as caching or buffering, selecting which track from which to play following channel change, or channel re-selection, the play position (e.g., from the start or other position in the track) from which to playback the cached track, and so on.

For example, the set of rules or algorithm used by the receiver 14 to control the sequencing or playback of tracks can be configured to accommodate or comply with legal restrictions (e.g., contractual or licensing restrictions) or regulatory restrictions on playing too many tracks by the same artist within a certain time period over streaming or broadcast media unless one of the constituent channels of the Mix Channel exceeds these limits permissibly. In other words, the radio receiver can be programmed to permit a Mix Channel that includes an artist-specific constituent channel (e.g., a single constituent channel dedicated exclusively or primarily to a single artist such as an Elvis Channel or a Grateful Dead Channel, or E-Street Radio) to exceed limits on repetition for that artist set by regulatory, contractual licensing restrictions.

Mix Channel Generation from Different Sources

Constituent channels have been described herein as multiplexed program channels in a transmitted content stream such as SDARS. This specific example of broadcast content is intended for illustrative purposes only. It is understood that there could be many more channels (e.g., hundreds of channels); that the channels can be broadcast, multicast, or unicast to the receiver; that the channels can be transmitted over satellite, a terrestrial wireless system (FM, HD Radio, etc.), over a cable TV carrier, streamed over an internet, cellular or dedicated IP connection (e.g., 2-way IP) or otherwise transmitted wirelessly or via wireline communications; and that the content of the channels could include any assortment of music, news, talk radio, traffic/weather reports, comedy shows, live sports events, commercial announcements and advertisements, etc. "Broadcast channel" herein is understood to refer to any of the methods described above or similar methods used to convey content for a channel to a receiving product.

In accordance with illustrative embodiments of the present invention, a user interface for a radio receiver or user device 14 can be configured to allow assignment of multiple FM and/or AM channels (e.g., analog FM and/or AM channels with RDS labels, or digital AM and/or FM channels) to a single Preset button, in place of or in addition to SDARS program channels, to create a Mix Channel. The radio receiver or user device 14 can then play songs or other content segments from any of these constituent channels by buffering content and alternating between channels on the boundaries between content segments (e.g., song boundaries). Accordingly, the following list provides examples of Mix Channels constructed from different types of sources:

a mix channel comprising at least two satellite digital audio radio (SDARS) channels;

a mix channel comprising at least one of the audio sources is an SDARs channel, and at least one of the other audio sources is a digitally recorded storage medium such as CD, DVD, or music library stored on any digital storage medium such as flash drive or hard drive;

a mix channel comprising at least one of the audio sources is an SDARs channel, and at least one of the other audio sources is an unrelated digital audio broadcast such as Digital FM or Digital AM radio;

a mix channel comprising at least two terrestrial digital radio sources such as Digital FM or Digital AM radio;

a mix channel generated from at least two folders or genres or categories of recorded audio (such as "Blues" or "Pop") from a digital music library to produce a mix channel which will alternate content from the at least two different genres of stored content (Blues/Rock); and a mix channel comprising a mix of at least two of the following digital audio sources:

At least one SDARs channel;

At least one Terrestrial digital radio channel(s);

audio from a Digitally recorded media.

Figure 26:
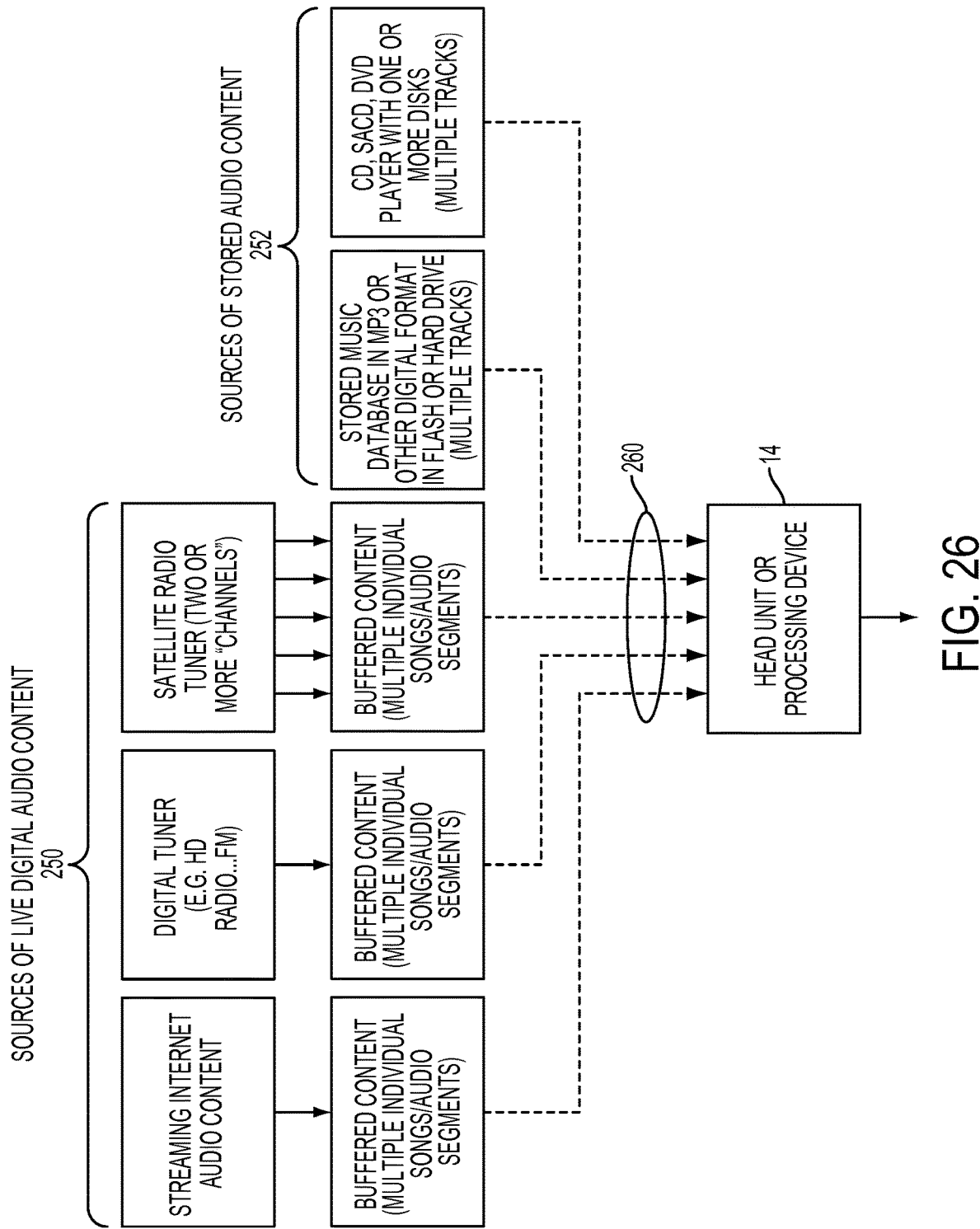
FIGS. 26 and 27 illustrate creating a Mix Channel from diverse content sources in accordance with an exemplary embodiment of the present invention.

FIG. 26 illustrates an example of a user device 14 that can be configured to generate a Mix Channel from two or more different sources where at least one of the sources 250 is buffered live content from transmitted digital audio content, and another of the sources 252 is a database or other recorded media. The sources of live audio content can be received from, but are not limited to, the following sources: streaming internet audio content, digital tuner for HD radio, digital AM or FM radio, analog AM or FM radio with RDS, and the like, and SDARS. In these various sources 250 of live audio content, individual songs or tracks have associated data (e.g., song title, artist name, program ID, or other ID) that allows them to be segmented and tagged in a buffer. Sources 252 of stored content can be, but are not limited to, a stored music database in MP3 or other digital format in flash or hard drive and having multiple tracks, a CD, a SACD, or a DVD player with one or more disks having multiple tracks. The sources 252 of stored content can be part of radio receiver 14 or a separate device such as a media player or smart phone. Individual pieces of audio content pulled from two or more buffered satellite radio channels or from a combination of at least two buffers or databases or recorded media (such as CD) indicated generally at 254 are provided to a head unit or processing device 14 to produce a Mix Channel by alternating sources of audio content on a segment by segment basis (e.g., song by song, track by track) and optionally blending or cross-fading the audio segments from different sources to provide a more seamless listening experience. Thus, the Mix Channel operation enhances existing "shuffle" modes for audio playback of stored content by including a mix of buffered live content (e.g., shuffling between different channels of content and/or between buffered content and stored content).

Figure 27:
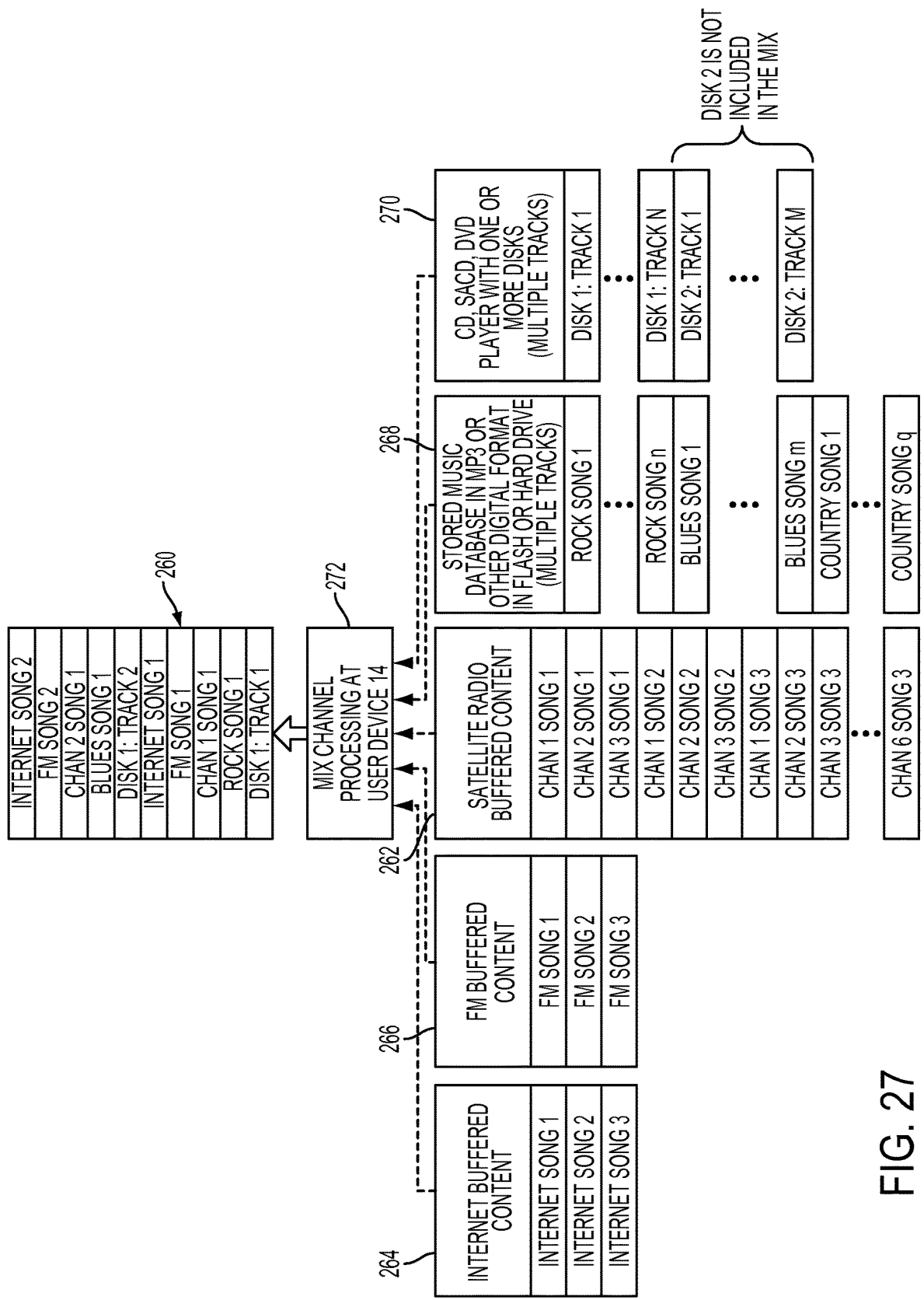

Shuffling is illustrated in FIG. 27. An example Mix Channel 260 is configured to have the following constituent channels or sources: 6 satellite radio channels 262, an internet streaming channel 264, a digital FM channel 266, stored Blues, Rock, and Country songs in a database 268, and tracks from a CD 270 (i.e., "Disk 1"). As stated above, the Mix Channel 260 is produced by alternating the constituent sources of audio content in accordance with a Mix Channel configuration on a segment by segment (or "song-by-song" or "track by track") basis and optionally overlapping and blending or cross-fading the audio segments from the different sources to provide a more seamless listening experience as indicated at 272. For example, a Mix Channel can be created wherein an artificial fade-in and fade-out is inserted by the radio receiver or user device 14 during playback to smooth the transition between audio segments originating from different sources such as a buffered SDARS or FM channel and an MP3 database. Alternatively, the playback of the alternating content segments from the Mix Channel buffer (e.g., the Mix Channel buffer comprising the content buffer 112 for the buffered received content, and memory for storing a song database) is slightly overlapped using a crossfade technique to simultaneously fade the last few seconds of one piece of content while ramping up the first few seconds of a second piece of content to more closely simulate the experience of listening to a normal channel.

The multiple source Mix Channel can be generated by buffering content from all live broadcast audio sources, and alternating the playback of audio from the buffers with the audio from the different sources in rotation. The playback can be without regard for the source by playing the oldest content in the buffer. Alternatively, some audio sources can be weighted to be played more frequently than other sources based on user input. The user can force the playback to skip to the next piece of buffered content by pressing a Forward or Skip button, or may skip backwards in the playback buffer (e.g., the Mix Channel buffer) to previously played content by pressing a Reverse or back button.

Inclusion, Filtering and Exclusion of Interstitial Content in Mix Channels

In accordance with an illustrative embodiment of the present invention, a radio receiver or user device 14 can be programmed or otherwise configured to implement one or more policies of filtering and excluding designated content in the constituent channels from the Mix Channel, and/or including designated content in the constituent channels in the Mix Channel.

For example, a radio receiver can be configured to always play, in the Mix Channel, any interstitials that were shorter than n seconds before the song they preceded on the original channel to avoid loss of some "curated" aspects of the Mix Channels. This policy would still result in no more interstitial play than in the original channels. Including preceding interstitials for Mix Channels can have more benefits than detractions, since the preceding interstitials can provide early clues as to which songs are to be skipped from playback. In another example, content injection occurs using HD. As described above in connection with FIGS. 15 and 18, content can be inserted into the Mix Channel playback stream (e.g., from an HD stream or stored content)

In addition, filtering can be performed, as described above. For example, to avoid (1) Mix Channel song/track playout repetitions due to the same song or track appearing on different constituent channels in close time proximity; or (2) Mix Channel playout close time proximity (e.g., as listener perceives), the radio receiver 14 can be configured to compare a "next playout candidate" song/track ID to the Mix channel's historical list of X number of songs/tracks or songs/tracks recently played out or played out within the last Y minutes of current playout (or real) time. If a candidate song/track has already played recently (though taken from another channel), it can be skipped or delayed with respect to Mix Channel generation to avoid playback of same artist within selected timer period In accordance with another example embodiment, the radio receiver 14 can have the ability to categorize and treat (e.g., allow/reject/delay playout) channel mix track/song playout candidates according to associated characteristics, either from broadcast information, data services information or intrinsic characteristics. Intrinsic characteristics would be those determined by the receiver, such as time of arrival, playout length or size, or time in buffer.

In accordance with another example embodiment, a Mix Channel is constructed whereby "interstitial content" such as DJ comments or station identification production elements lasting less than a specified duration are stripped from playback or are not included in the playback buffer. The specified duration can be fixed or is adjustable by the user. Further, the specified duration can be adjustable by the broadcaster through an over-the-air message. Also, a flag or indication can be sent over-the-air to distinguish between "content segments" and "interstitial segments" regardless of duration so that the radio can skip long duration interstitial segments.

Alternatively, the interstitial content such as DJ comments are concatenated with the following content segment so that introductory or explanatory comments are kept with the content that they relate to rather than excluded from playback. The interstitial content can also be concatenated with the preceding content, or skipped based on the value of a flag or indication that is sent over-the-air for each piece of interstitial content. A flag or indication can be sent over-the-air to distinguish between "content segments" and "interstitial segments" regardless of duration so that the radio receiver or user device 14 can take the appropriate action and concatenate long-duration interstitial segments with the following content segment.

In accordance with another embodiment of the present invention, constituent channels of a Mix Channel can comprise at least one program channel containing audio content and a channel containing advertising segments. A user can therefore pay an additional fee for a radio receiver configured to block the constituent channel containing the advertisements, or can listen to the Mix Channel containing one or more advertisement segments mixed with the audio content for a low (or no) fee. Alternatively, the subscribed radio receivers can be configured to drop the channel or channels containing advertising altogether to prevent their use as constituents in any Mix Channel. Similarly, radio receivers can be configured to be prevented from using certain program channels as constituent channels when their content will not provide clear track boundaries or will otherwise provide an unsatisfactory listening experience in a Mix Channel.

It is to be understood that the present invention can also be embodied as computer-readable codes on a computer-readable recording medium. The computer-readable recording medium is any data storage device that can store data which can thereafter be read by a computer system. Examples of the computer-readable recording medium include, but are not limited to, read-only memory (ROM), random-access memory (RAM), CD-ROMs, magnetic tapes, floppy disks, and optical data storage devices. The computer-readable recording medium can also be distributed over network-coupled computer systems so that the computer-readable code is stored and executed in a distributed fashion. Also, functional programs, codes, and code segments for accomplishing the present invention can be easily construed as within the scope of the invention by programmers skilled in the art to which the present invention pertains.

While the invention has been shown and described with reference to a certain embodiment thereof, it will be understood by those skilled in the art that various changes in form and details may be made therein without departing from the spirit and scope of the invention. Consequently, the scope of the invention should not be limited to the embodiment, but should be defined by the appended claims and equivalents thereof.

What is claimed is:

1. A method of generating a mix channel from multiple sources, comprising:
   receiving, by a receiver, a satellite data stream and a separate Internet channel, the satellite data stream including a plurality of program channels and a broadcast information channel,
      wherein each of the program channels includes multiple content segments and interstitial segments, and
      wherein the broadcast information channel includes auxiliary data for locating:
      beginnings of the content segments, and
      an interstitial segment lasting less than a predetermined duration of time for exclusion from the mix channel;
   designating, at the receiver, a subset of the plurality of program channels and the Internet channel as constituent channels of the mix channel;
   identifying by the receiver and based on the auxiliary data, the beginnings of the content segments and the interstitial segments lasting less than the predetermined duration of time for the constituent channels;
   buffering, based on the beginnings of each of the content segments, complete content segments respectively associated with each of the designated constituent channels of the mix channel in a content buffer as they are received; and
   generating, by the receiver and responsive to a user input selecting a single preset button on the receiver, the mix channel for playback based on:
      automatically excluding the interstitial segments lasting less than the predetermined duration of time, and
      including the buffered complete content segments.

2. The method of claim 1, wherein the constituent channels are designated based at least in part on user input and/or by a content provider that transmits the content streams, wherein the interstitial segments include a commercial or a short audio segment, and wherein the Internet channel is a unicast channel.

3. The method of claim 1, wherein the receiver has a user interface comprising a plurality of buttons corresponding to respective ones of the constituent channels for directly tuning individually to the corresponding one of the constituent channels when activated, and activation of single user interface control button commences the playing back of segments from each of the buffered constituent channels that correspond to the plurality of buttons.

4. The method of claim 3, wherein the user interface comprises a programmable touch-sensitive display screen having a display area showing a first bank of soft buttons programmable to tune directly to respective ones of the constituent channels when activated.

5. The method of claim 4, wherein the display area is programmed to show a second bank of soft buttons programmable to tune to respective ones of a group of channels comprising at least one channel that is different from the constituent channels, the receiver being configured to buffer the group of channels as they are received and an activation of a single user interface control button commences the playing back of segments from each of the group of channels when the second bank of soft buttons is displayed.

6. The method of claim 1, wherein at least one content stream, of the satellite data stream, provides several genres of audio programming and several audio program channels for each of the genres, and the constituent channels comprise a plurality of audio program channels containing audio segments corresponding to the same genre.

7. The method of claim 1, wherein at least one content stream, of the satellite data stream, provides several genres of audio programming comprising at least one of music genres, news genres, sports genres, and entertainment genres comprising at least comedy, and the constituent channels comprise a plurality of audio program channels containing audio segments corresponding to at least two genres selected based on a time of day.

8. The method of claim 1, wherein at least one of the constituent channels is based on a manual selection by a user and/or automatically selected based on usage data.

9. The method of claim 1, wherein the receiver has a user interface comprising a plurality of preset buttons and each preset button is configured to tune to at least one of the program channels, the method further comprising:
   tuning the receiver to a current program channel;
   selecting a preset button that is assigned to another program channel;
   generating a prompt for a user to select one of:
      an add option to add the current program channel to the preset button assignment, and
      a replace option to replace the preset button assignment to the other program channel with an assignment to the current program channel;

assigning, to the preset button, both the current program channel and the other program channel, if the add option is selected, wherein segments can be selected and mixed for playback from both the current program channel and the other program channel; and replacing the preset button assignment with the current program channel if the replace option is selected.

10. The method of claim 1, wherein the generating the mix channel for playback comprises locating the beginnings of the complete content segments in the content buffer, and sequentially playing from the beginning of each complete content segment based on a designated channel order by automatically switching between the constituent channels in the designated channel order.

11. The method of claim 1, further comprising: receiving, by the receiver and via at least one of in-band and out-of-band signaling with respect to at least one content stream of the satellite data stream, control data indicating content provider-specified constituent channels for one or more mix channels.

12. The method of claim 1, further comprising:
receiving a user input to skip forward or backward during playback of the mix channel;
switching to a next or previous stored content segment associated with buffered constituent channels according to a designated channel order in response to, respectively, the skip forward or backward input; and
playing the next or previous stored content segment.

13. The method of claim 1, wherein the content buffer is a multi-channel memory including a background instant replay (BIR) buffer and a foreground instant replay (FIR) buffer, wherein the BIR buffer is associated with some or all of the plurality of program channels and the FIR buffer is associated with a currently selected channel, and wherein the buffering comprises simultaneously storing content segments of each of the constituent channels in respective memory blocks of the multi-channel memory.

14. The method of claim 13, wherein the buffering in each of the respective memory blocks employs a circular buffer format.

15. The method of claim 1, wherein the generating the mix channel for playback is based on a designated channel order associated with selecting at least one of the constituent channels for playback more frequently than the other constituent channels.

16. The method of claim 1, wherein the generating the mix channel for playback is based on a designated channel order comprising a default setting or user-specified setting, the method further comprising:
designating a music library stored on an accessible digital storage medium as an additional constituent channel of the mix channel.

17. The method of claim 16, wherein the default setting comprises round robin playback from the constituent channels and a rule for selecting a candidate segment when each buffered constituent channel is selected for the round robin playback.

18. The method of claim 16, wherein the default setting can be reviewed and edited by a user, and further comprising generating a prompt at the receiver to indicate to the user when a default choice is made by the receiver that warrants review by the user.

19. The method of claim 1, wherein generating the mix channel for playback is based on a designated channel order, the method further comprising selecting one of the multiple segments from one of the buffered constituent channels for playback based on:

the designated channel order, and
determining which of the multiple segments is the oldest and un-played segment stored in the buffer for that constituent channel.

20. The method of claim 1, further comprising:
receiving, at the receiver, additional program channels from at least two different sources of content streams selected from a group consisting of satellite digital audio radio service, high definition (HD) radio, digital FM radio, digital AM radio, analog FM radio with radio data system (RDS); and
designating channels from the at least two different sources as constituent channels.

21. The method of claim 20, further comprising:
storing the additional program channels on a memory device; and designating the content on the memory device as one of the constituent channels.

22. The method of claim 1, wherein at least one of the constituent channels comprises advertising segments, and further comprising excluding the advertising segments from playback by the receiver if the receiver is subscribed to a commercial free service.

23. The method of claim 1, further comprising:
receiving, by the receiver, a user input based on a selection of a present button configured to scan through the constituent channels of the mix channel; and
upon receipt of the user input, cycling through each of the constituent channels by playing back a short excerpt of audio content respectively associated with each of the constituent channels of the mix channel.

24. The method of claim 1, further comprising:
determining, based on the mix channel, a next content segment for playback that is adjacent to a current content segment being played back;
comparing the next content segment with content segments that have been played back within a predetermined time period;
if the next content segment matches one of the content segments that have been played back within the predetermined time period, removing the next content segment from the mix channel to generate a modified mix channel; and
beginning playback of the modified mix channel.

25. An apparatus for generating a mix channel from multiple sources, comprising:
a system controller;
a channel decoder;
an audio decoder in communication with the system controller, the channel decoder and audio decoder arranged to decode a satellite data stream and a separate Internet channel, wherein the satellite data stream includes a plurality of program channels and a broadcast information channel,
wherein each of the plurality of program channels includes multiple content segments and interstitial segments, and
wherein the broadcast information channel includes auxiliary data for locating:
beginnings of the content segments, and
interstitial segments lasting less than a predetermined duration of time for exclusion from the mix channel;
memory in communication with the system controller; and
a user interface in communication with the system controller and including at least a single user interface control button, wherein the system controller, in response to a directive designating a subset of the plurality of program channels and the Internet channel as constituent channels of a mix channel:
- identifies complete content segments buffered in the content buffer based on the auxiliary data;
- buffers, based on the beginnings of each of the content segments, complete content segments respectively associated with each of the designated constituent channels of the mix channel in a content buffer as they are received; and
- generates the mix channel for playback based on automatically excluding the interstitial segments and including the buffered complete content segments of the constituent channels when the single user interface control button is selected.

26. The apparatus of claim 25, wherein the single user interface control button is a physical button on a user interface or a soft button on a programmable touch-sensitive display screen, and wherein the system controller designates a music library stored on an accessible digital storage medium as an additional constituent channel of the mix channel.

27. The apparatus of claim 25, wherein the constituent channels are specified by one of a user, and a content provider that transmits the satellite data stream, and wherein the Internet channel is a unicast channel.

28. The apparatus of claim 25, wherein the user interface comprises a plurality of preset buttons corresponding to respective ones of the constituent channels for directly tuning individually to the corresponding one of the constituent channels when activated, and activation of the single user interface control button commences output of content from each of the constituent channels that correspond to the plurality of preset buttons.

29. The apparatus of claim 28, wherein the user interface comprises a programmable touch-sensitive display screen having a display area showing a first bank of soft buttons programmable to tune directly to respective ones of the constituent channels when activated.

30. The apparatus of claim 29, wherein the display area is programmed to show a second bank of soft buttons programmable to tune to respective ones of a group of channels comprising at least one channel that is different from the constituent channels, the system controller being configured to buffer the group of channels as they are received and, upon activation of the single user interface control button, commence output of content from each of the group of channels when the second bank of soft buttons is displayed.

* * * * *